US008645685B2

(12) United States Patent
Nguyen et al.

(10) Patent No.: US 8,645,685 B2
(45) Date of Patent: Feb. 4, 2014

(54) TOKEN AUTHENTICATION

(75) Inventors: Binh T. Nguyen, Reno, NV (US); Craig A. Paulsen, Reno, NV (US); David Muir, Newcastle (AU); Harry P. Tolles, Reno, NV (US)

(73) Assignee: IGT, Reno, NV (US)

(*) Notice: Subject to any disclaimer, the term of this patent is extended or adjusted under 35 U.S.C. 154(b) by 710 days.

(21) Appl. No.: 11/567,109

(22) Filed: Dec. 5, 2006

(65) Prior Publication Data

US 2007/0094721 A1 Apr. 26, 2007

Related U.S. Application Data

(63) Continuation-in-part of application No. 10/926,636, filed on Aug. 25, 2004, which is a continuation-in-part of application No. 10/085,154, filed on Feb. 27, 2002, now Pat. No. 6,905,411.

(51) Int. Cl.
*G06F 21/00* (2013.01)

(52) U.S. Cl.
USPC .............................. 713/159; 726/16; 235/492

(58) Field of Classification Search
USPC .................................... 235/380–492; 726/16
See application file for complete search history.

(56) References Cited

U.S. PATENT DOCUMENTS 4,385,285 A 5/1983 Horst et al.
4,926,996 A 5/1990 Eglise et al.
5,038,022 A 8/1991 Lucero
5,056,141 A 10/1991 Dyke
5,166,502 A 11/1992 Rendleman et al.
5,179,517 A 1/1993 Sarbin et al.
5,195,133 A 3/1993 Kapp et al.
5,265,874 A 11/1993 Dickinson et al.
5,326,104 A 7/1994 Pease et al.
5,398,932 A 3/1995 Eberhardt et al.
5,470,079 A 11/1995 Lestrange et al.
5,498,859 A 3/1996 Farmont
5,505,449 A 4/1996 Eberhardt et al.
5,513,272 A 4/1996 Bogosian (Continued)

FOREIGN PATENT DOCUMENTS

EP 0360613 9/1989
EP 1120757 A2 1/2001

(Continued)

OTHER PUBLICATIONS

Schluessler, "Is a Bot at the Controls ? Detecting Input Data Attacks", 2007, Intel Corp., p. 1-6.*

(Continued)

*Primary Examiner* — Taghi Arani
*Assistant Examiner* — Gregory Lane
(74) *Attorney, Agent, or Firm* — Foley & Lardner LLP

(57) ABSTRACT

Methods and devices are described that authenticate portable tokens, such as plastic tokens used in casinos on card tables. The systems and methods assign authentication data to a token. The authentication data is verified when a person tries to redeem value on the token. A person's authentication data may be acquired via an interface provided by a gaming machine, for example, and the authentication data stored so that the authentication information is later be read when someone tries to redeem value on the token. Only a person who presents the tokens and authentication data could then negotiate such tokens.

55 Claims, 9 Drawing Sheets

(56) References Cited

U.S. PATENT DOCUMENTS

| | | | | |
|---|---|---|---|---|
| 5,605,506 | A | 2/1997 | Hoorn | |
| 5,651,548 | A | 7/1997 | French | |
| 5,706,925 | A | 1/1998 | Orus et al. | |
| 5,735,742 | A | 4/1998 | French | |
| 5,761,647 | A | 6/1998 | Boushy | |
| 5,762,552 | A | 6/1998 | Vuong | |
| 5,764,789 | A | 6/1998 | Pare, Jr. et al. | |
| 5,795,226 | A | 8/1998 | Yi | |
| 5,855,515 | A | 1/1999 | Pease et al. | |
| 5,892,210 | A | 4/1999 | Levasseur | |
| 5,895,321 | A | 4/1999 | Gassies et al. | |
| 5,902,983 | A | 5/1999 | Crevelt et al. | |
| 5,953,709 | A | 9/1999 | Gilbert et al. | |
| 5,954,583 | A | 9/1999 | Green | |
| 6,003,013 | A | 12/1999 | Boushy | |
| 6,003,651 | A | 12/1999 | Waller et al. | |
| 6,021,949 | A * | 2/2000 | Boiron | 235/492 |
| 6,029,891 | A * | 2/2000 | Freeman et al. | 235/380 |
| 6,048,269 | A | 4/2000 | Burns et al. | |
| 6,050,895 | A | 4/2000 | Luciano, Jr. et al. | |
| 6,062,981 | A | 5/2000 | Luciano, Jr. | |
| 6,099,408 | A | 8/2000 | Schneier et al. | |
| 6,104,815 | A | 8/2000 | Alcorn et al. | |
| 6,109,530 | A | 8/2000 | Larson et al. | |
| 6,113,098 | A | 9/2000 | Adams | |
| 6,148,094 | A | 11/2000 | Kinsella | |
| 6,174,234 | B1 | 1/2001 | Seibert et al. | |
| 6,183,362 | B1 | 2/2001 | Boushy | |
| 6,186,895 | B1 | 2/2001 | Oliver | |
| 6,193,152 | B1 | 2/2001 | Fernando et al. | |
| 6,193,153 | B1 | 2/2001 | Lambert | |
| 6,227,972 | B1 | 5/2001 | Walker et al. | |
| 6,234,900 | B1 | 5/2001 | Cumbers | |
| 6,264,109 | B1 | 7/2001 | Chapet et al. | |
| 6,280,326 | B1 | 8/2001 | Saunders | |
| 6,296,190 | B1 | 10/2001 | Rendleman | |
| 6,330,162 | B2 | 12/2001 | Sakamoto et al. | |
| 6,383,076 | B1 | 5/2002 | Tiedeken | |
| 6,394,907 | B1 | 5/2002 | Rowe | |
| 6,450,887 | B1 | 9/2002 | Mir | |
| 6,471,590 | B2 | 10/2002 | Saunders | |
| 6,488,585 | B1 | 12/2002 | Wells | |
| 6,500,067 | B1 | 12/2002 | Luciano et al. | |
| 6,511,377 | B1 | 1/2003 | Weiss | |
| 6,527,175 | B1 | 3/2003 | Dietz et al. | |
| 6,547,664 | B2 | 4/2003 | Saunders | |
| 6,554,704 | B2 | 4/2003 | Nicastro | |
| 6,558,256 | B1 | 5/2003 | Saunders | |
| 6,577,733 | B1 | 6/2003 | Charrin | |
| 6,585,589 | B2 | 7/2003 | Okuniewicz | |
| 6,607,441 | B1 | 8/2003 | Acres | |
| 6,612,928 | B1 | 9/2003 | Bradford et al. | |
| 6,629,019 | B2 | 9/2003 | Legge | |
| 6,629,591 | B1 | 10/2003 | Griswold | |
| 6,650,427 | B2 | 11/2003 | Brooks et al. | |
| 6,652,380 | B1 | 11/2003 | Luciano | |
| 6,671,358 | B1 | 12/2003 | Seidman | |
| 6,675,152 | B1 | 1/2004 | Prasad et al. | |
| 6,679,775 | B1 | 1/2004 | Luciano et al. | |
| 6,682,073 | B2 | 1/2004 | Bryant | |
| 6,690,673 | B1 | 2/2004 | Jarvis | |
| 6,709,333 | B1 | 3/2004 | Bradford et al. | |
| 6,712,698 | B2 | 3/2004 | Paulsen | |
| 6,722,985 | B2 | 4/2004 | Criss-Puszkiewicz et al. | |
| 6,761,632 | B2 | 7/2004 | Bansemer | |
| 6,786,824 | B2 | 9/2004 | Cannon | |
| 6,811,482 | B2 | 11/2004 | Letovsky | |
| 6,852,031 | B1 | 2/2005 | Rowe | |
| 6,866,586 | B2 | 3/2005 | Oberberger | |
| 6,905,411 | B2 | 6/2005 | Nguyen et al. | |
| 6,908,387 | B2 | 6/2005 | Hedrick et al. | |
| 6,913,534 | B2 | 7/2005 | DeFrees-Parrott | |
| 6,932,706 | B1 | 8/2005 | Kaminkow | |
| 6,984,174 | B2 | 1/2006 | Cannon | |
| 6,999,936 | B2 | 2/2006 | Sehr | |
| 7,017,805 | B2 | 3/2006 | Meehan | |
| 7,174,277 | B2 | 2/2007 | Vock | |
| 7,185,199 | B2 | 2/2007 | Balfanz | |
| 2001/0018660 | A1 | 8/2001 | Sehr | |
| 2002/0031230 | A1* | 3/2002 | Sweet et al. | 380/278 |
| 2002/0063622 | A1 | 5/2002 | Armstrong | |
| 2002/0068629 | A1* | 6/2002 | Allen et al. | 463/42 |
| 2002/0113124 | A1 | 8/2002 | Meyerhofer et al. | |
| 2002/0114006 | A1 | 8/2002 | Matoba | |
| 2002/0142825 | A1 | 10/2002 | Lark et al. | |
| 2002/0147040 | A1 | 10/2002 | Walker | |
| 2002/0151354 | A1 | 10/2002 | Boesen | |
| 2002/0151359 | A1 | 10/2002 | Rowe | |
| 2002/0173354 | A1 | 11/2002 | Winans | |
| 2002/0181007 | A1 | 12/2002 | Brooks et al. | |
| 2003/0027635 | A1 | 2/2003 | Walker et al. | |
| 2003/0032474 | A1 | 2/2003 | Kaminkow | |
| 2003/0036425 | A1 | 2/2003 | Kaminkow | |
| 2003/0038176 | A1 | 2/2003 | Dabrowski | |
| 2003/0054878 | A1 | 3/2003 | Benoy et al. | |
| 2003/0065805 | A1 | 4/2003 | Barnes | |
| 2003/0069057 | A1 | 4/2003 | DeFrees-Parrott | |
| 2003/0078094 | A1 | 4/2003 | Gatto et al. | |
| 2003/0100371 | A1 | 5/2003 | Gatto et al. | |
| 2003/0106769 | A1 | 6/2003 | Weiss | |
| 2003/0119576 | A1 | 6/2003 | McClintic | |
| 2003/0131265 | A1* | 7/2003 | Bhakta | 713/202 |
| 2003/0162591 | A1* | 8/2003 | Nguyen et al. | 463/29 |
| 2003/0171145 | A1 | 9/2003 | Rowe | |
| 2003/0186739 | A1 | 10/2003 | Paulsen | |
| 2003/0220138 | A1 | 11/2003 | Walker | |
| 2003/0220835 | A1 | 11/2003 | Barnes | |
| 2003/0228901 | A1 | 12/2003 | Walker | |
| 2003/0228907 | A1* | 12/2003 | Gatto et al. | 463/42 |
| 2004/0030655 | A1 | 2/2004 | Tanaka et al. | |
| 2004/0046642 | A1 | 3/2004 | Becker | |
| 2004/0111369 | A1 | 6/2004 | Lane | |
| 2004/0162130 | A1 | 8/2004 | Walker | |
| 2004/0176157 | A1 | 9/2004 | Walker | |
| 2004/0198490 | A1 | 10/2004 | Bansemer | |
| 2004/0204215 | A1 | 10/2004 | Meehan | |
| 2004/0219982 | A1 | 11/2004 | Khoo | |
| 2004/0235552 | A1 | 11/2004 | Gauselmann | |
| 2005/0009601 | A1 | 1/2005 | Manfredi | |
| 2005/0014548 | A1 | 1/2005 | Thomas | |
| 2005/0020354 | A1* | 1/2005 | Nguyen et al. | 463/25 |
| 2005/0040934 | A1 | 2/2005 | Shanton | |
| 2005/0085294 | A1 | 4/2005 | Walker | |
| 2005/0107155 | A1 | 5/2005 | Potts | |
| 2005/0107156 | A1 | 5/2005 | Potts | |
| 2005/0124408 | A1 | 6/2005 | Vlazny | |
| 2005/0153776 | A1 | 7/2005 | LeMay | |
| 2005/0187020 | A1 | 8/2005 | Amaitis | |
| 2005/0197190 | A1 | 9/2005 | Amaitis | |
| 2005/0234769 | A1 | 10/2005 | Jain | |
| 2005/0250578 | A1 | 11/2005 | Slomiany | |
| 2005/0282606 | A1 | 12/2005 | Fiden | |
| 2006/0046842 | A1 | 3/2006 | Mattice | |
| 2007/0087834 | A1* | 4/2007 | Moser et al. | 463/42 |

FOREIGN PATENT DOCUMENTS

| | | | |
|---|---|---|---|
| EP | 1120757 | | 8/2001 |
| WO | WO94/10658 | | 5/1994 |
| WO | WO94/16416 | | 7/1994 |
| WO | WO99/19027 | | 4/1999 |
| WO | WO 02/32519 | * | 10/2000 |
| WO | WO 01/84516 | | 11/2001 |
| WO | WO/02/32519 | | 4/2002 |
| WO | WO02/32519 | | 4/2002 |

OTHER PUBLICATIONS

Australian Examiner's Report dated May 26, 2008, for related Australian Application No. 2003217861.

International Search Report and Written Opinion of the International Searching Authority dated Aug. 29, 2008, for related PCT Application No. PCT/US2007/085650.

Office Action dated Sep. 10, 2007 for U.S. Appl. No. 10/926,636.

(56) References Cited

OTHER PUBLICATIONS

Final Office Action dated Apr. 16, 2008 for U.S. Appl. No. 10/926,636.
Office Action dated Nov. 6, 2008 for U.S. Appl. No. 10/926,636.
First Advisory Office Action mailed Dec. 4, 2006, for Russian Patent Application No. 2004126258/09 (028554) 11 pp.
Columbus, "Lessons Learned in Las Vegas: Loyalty Programs Pay," http://www.crmbuyer.com/story/45033.html, Jul. 29, 2005.
Pogash, "From Harvard Yard to Vegas Strip," Forbes.com, http://www.forbes.com/asap/2002/1007/048_print.html, Oct. 7, 2002.
Promo Magazine, "Harrah's Ups the Ante," http://promomagazine.com/othertactics/marketing_harrahs_ups_ante/.
Chen, "Harrah's Places Its CRM Bet," eweek Enterprise News & Reviews, http://www.eweek.com/article2/0,1895,1238689,00.asp, Apr. 2, 2001.
Lundquist, "Harrah's Bets on IT," eweek Enterprise News & Reviews, http://www.eweek.com/articie2/0,1895,1828800,00.asp, Jun. 20, 2005.
Klugsberger, "What Made Harrahs an Innovation Leader?" GEMBA 2005, Jun. 20, 2005.
U.S. Appl. No. 09/642,192, filed Aug. 18, 2000.
Second Advisory Office Action mailed May 28, 2007, for Russian Patent Application No. 2004126258/09 (028554) 11 pp.
Examiner's Communication pursuant to Article 96(2) EPC dated Jul. 11, 2007, from European Patent Application No. 03713830.2, Player Authentication for Cashless Gaming Machine Instruments, 4 pp.
International Search Report, dated Dec. 9, 2005 from corresponding International Application No. PCT/US2005/029660, including Notification of Transmittal, 5 pp.
Written Opinion of the International Searching Authority, dated Dec. 9, 2005 from corresponding International Application No. PCT/US2005/029660, 7 pp.
Final Office Action dated Sep. 24, 2009 for U.S. Appl. No. 10/926,636.
Non-Final Office Action dated Aug. 25, 2010 for U.S. Appl. No. 10/926,636.
Notice of Allowance dated Jan. 27, 2011 for U.S. Appl. No. 10/926,636.
CA Office Action dated Jan. 31, 2011 issued in Application No. 2,477,454.
US Notice of Allowance dated Jan. 27, 2011 issued in U.S. Appl. No. 10/926,636.
EP Office Action dated Mar. 8, 2011 issued in Application No. 07871591.9.
AU 1st Office Action dated Sep. 2, 2011 issued in Application No. 2007329608.
AU 2nd Office Action dated Jul. 10, 2012 issued in Application No. 2007329608.
CA Office Action dated Apr. 19, 2012 issued in Application No. 2,477,454.
Examination report regarding European Application No. 03713830.2, mail date Jan. 17, 2013, 7 pages.

* cited by examiner

500

502 504 506 508 510 512

| token number | current owner | value | authentication status | location | authentication data |
|---|---|---|---|---|---|
| 010001 | 00010020 | $1 | single | person | PIN = 1167 |
| 010002 | John Doe | $1 | single | poker table #4 | personal I.D. |
| 010003 | Dave Smith | $1 | Collective: family | craps table #26 | room card |
| 010004 | casino | $5 | standard | gaming machine 145 | none |
| 010005 | casino | $10 | standard | cashier 37 | none |

501

*Figure 8*

TOKEN AUTHENTICATION

CROSS-REFERENCE TO RELATED APPLICATION

This application is a continuation-in-part of and claims priority under 35 U.S.C. §120 to a) commonly owned and co-pending of U.S. patent application Ser. No. 10/926,636 entitled "Methods and Devices for Gaming Account Management," and b) U.S. Pat. No. 6,905,411, entitled "Player Authentication for Cashless Gaming Machine Instruments" (the Ser. No. 10/926,636 application claimed priority under 35 U.S.C. §120 to U.S. Pat. No. 6,905,411, while pending as an application); both of these documents are hereby incorporated by reference in their entirety for all purposes.

FIELD OF THE INVENTION

The present invention relates to portable tokens used in gaming properties. In particular, the invention relates to portable tokens that have ownership assigned to them and to methods of authenticating ownership of the tokens when they are redeemed.

BACKGROUND OF THE INVENTION

There are a wide variety of associated devices that can be connected to a gaming machine such as a slot machine or video poker machine. Some examples of these devices are lights, ticket printers, card readers, speakers, bill validators, ticket readers, coin and token acceptors, display panels, key pads, coin and token hoppers, and button pads.

Typically, utilizing a master gaming controller, the gaming machine controls various combinations of devices that allow a player to play a game on the gaming machine and also encourage game play on the gaming machine. For example, a game played on a gaming machine usually requires a player to input money or indicia of credit into the gaming machine, indicate a wager amount, and initiate a game play. These steps require the gaming machine to control input devices, including bill validators and coin acceptors, to accept money into the gaming machine and recognize user inputs from devices, including key pads and button pads, to determine the wager amount and initiate game play.

As technology in the gaming industry progresses, the traditional method of dispensing coins as awards for winning game outcomes is being supplemented by digital systems such as electronic tokens and ticket dispensers that print ticket vouchers, either of which may be exchanged for cash or accepted as credit in other gaming machines for additional game play. An award ticket system, which allows award ticket vouchers to be dispensed and utilized by other gaming machines, increases the operational efficiency of maintaining a gaming machine and simplifies the player pay out process. Award ticket systems and systems using other cashless mediums—such as electronic tokens—are referred to as cashless systems.

Currently, cashless systems have become very popular and have been embraced by casino customers. For example, tokens that are bought during buy-in and used for cash at poker and blackjack tables within a casino are well accepted by game players. However, currently, portable tokens, even those with digital chips and other forms of digital management included with newer tokens, can be used for game play in a gaming machine or redeemed for cash by anyone who has possession of the token, whether or not the rightful owner presents the token. If there were a way to authenticate the rightful owner, cashless system integrity (and casino patron confidence) would be enhanced.

SUMMARY OF THE INVENTION

The present invention provides gaming systems and methods that authenticate portable tokens, such as plastic tokens used in casinos on card tables. The systems and methods assign authentication data to a token. The authentication data is verified when a person tries to redeem value on the token. A person's authentication data may be acquired via an interface provided by a gaming machine, for example, and the authentication data stored so that the authentication information may later be read when someone tries to redeem value on the token. Only a person who presents the authentication data and tokens could then negotiate such tokens.

In one aspect, the present invention relates to a method of providing a portable gaming token. The portable gaming token includes a body. The method includes assigning an identification number to the portable gaming token. The method also includes assigning authentication data to the identification number. The authentication data is designed to limit transactions of value on the token to an entitled token owner that can present the authentication data. The method further includes storing the authentication data and the identification number. The method additionally includes providing the gaming token to a person.

In another aspect, the present invention relates to a method for transacting (e.g., redeeming) value on a portable gaming token. The method includes assigning an identification number to the portable gaming token. The method also includes assigning authentication data to the identification number. The method further includes storing the authentication data and the identification number. The method additionally includes receiving a request to use the value on the token. The method also includes obtaining authentication data from a person, and verifying that the person is an entitled token owner—using the authentication data obtained from the person and the authentication data stored with the identification number. The method then includes authorizing the value when the person is an entitled token owner.

In yet another aspect, the present invention relates to a computer readable medium including instructions for method for providing transactions of value on portable gaming tokens.

In still another aspect, the present invention relates to a portable gaming token for use in a gaming property. The token includes an identification number that distinguishes the token from other tokens. The token also includes authentication data associated with the identification number and designed to control transactions of value on the token to an entitled token owner that can present the authentication data. The token further includes a wireless transponder that permits wireless communication of the identification number and the authentication data with a reader using a wireless signal that passes through the token body.

In another aspect, the present invention relates to a server for use in a gaming system. The server includes a processor and a memory configured to store information for a set of tokens. The information for each token includes an identification number that distinguishes the token from other tokens in the set, and includes authentication data associated with the identification number and designed to control transactions of value on the token to an entitled token owner that can present the authentication data. The server also includes a communications interface configured to communicate with a first gaming device and a second gaming device.

In yet another aspect, the present invention relates to a gaming device, such as a gaming machine or card table, that controls transactions of value on a token to an entitled token owner. The gaming device includes a processor and a reader configured to transmit a wireless probe to the token and configured to receive a wireless message from the token that includes identification data for the token. The gaming device also includes a memory comprising instructions for a) comparing stored authentication data stored with authentication data obtained from a person at the gaming device to determine if the person is an entitled token owner, and b) authorizing the value when the person is an entitled token owner.

The foregoing aspects and implementations of the invention may be embodied in software, in hardware (such as in gaming machines, card tables, cash out kiosks, or other machines) or otherwise. These and other features of the present invention are described below with reference to the drawings.

BRIEF DESCRIPTION OF THE DRAWINGS

FIG. 8 presents an exemplary logical representation of a database for storing authentication data and other information for a large number of tokens in accordance with a specific embodiment of this invention.

DETAILED DESCRIPTION OF SPECIFIC EMBODIMENTS

Figure 1:
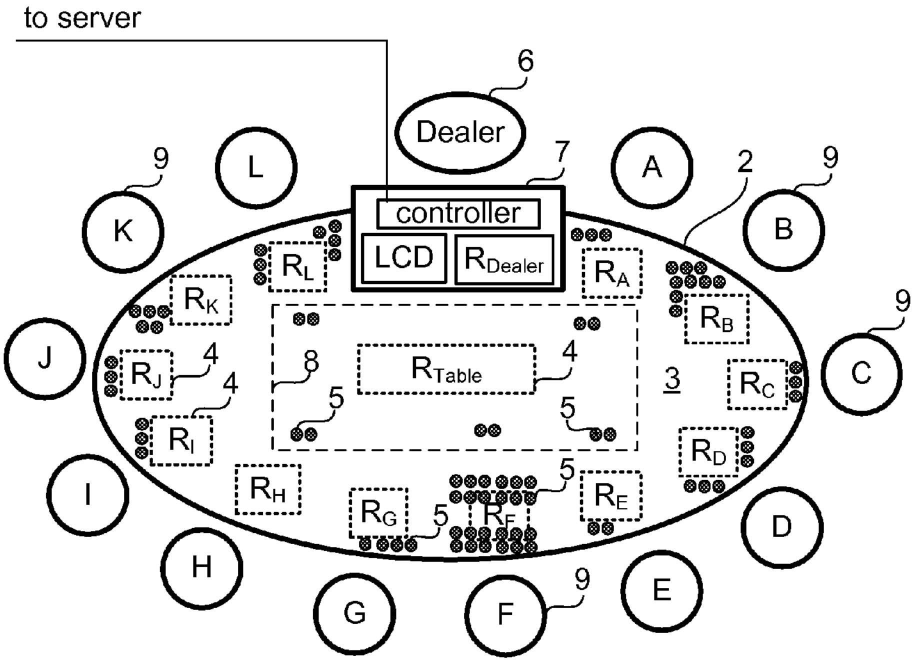
FIG. 1 shows a poker table in accordance with one embodiment of the present invention.

Reference will now be made in detail to specific embodiments of the invention. Examples of the specific embodiments are illustrated in the accompanying drawings. While the invention will be described in conjunction with these specific embodiments, it will be understood that it is not intended to limit the invention to such specific embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The present invention improves portable token integrity. The systems and methods couple authentication data and processes to the portable tokens. A player's authentication data may be acquired, for example, when tokens are issued or when the person registers at a casino or hotel; or a player's authentication data may be acquired via an interface provided at a gaming machine or card table. The authentication data is then stored so that the authentication data may later be acquired. For example, the authentication data may be digitally stored in memory included in a token or stored in memory accessible to a central server. Value on the tokens then only be negotiated (i.e., used for game play or redeemed for cash or other value (e.g., prizes)) by an entitled token owner (e.g., the same player or a designated friend) who can present the authentication data. This way, if the tokens are lost or stolen, someone unintended cannot cash in the tokens unless the authentication data is also presented.

The 'authentication information' generally refers to security information that a person can present, while 'authentication data' refers to a digital or numerical representation of the authentication information, typically for storage in memory or for computer comparison. For example, the authentication information may refer to biometric information that uniquely identifies a person, while authentication data may refer to a digital representation of the biometric information. Alternatively, the authentication information may include a PIN number that is easily translated into a digital format using a keypad on a gaming machine. The authentication information may include: something a person carries, something the person knows, biometric information, and combinations thereof. Suitable examples of authentication information include: a signature, photo, biometric information, birth date, social security number, a PIN or password, or player identification information associated with a player tracking system operating on the gaming system. The authentication data may refer to a digital representation of each of these pieces of authentication information. Multiple forms of authentication information may also be used. Further examples and description of authentication information are described below. For simplicity, the remaining disclosure may use authentication information and authentication data interchangeably, although it is understood that some form of digital representation or translation usually separates the two.

The authentication data may be stored on a gaming system server, on a portable token, other locations such as a validation terminal, and combinations thereof. The authentication data may be encrypted or otherwise protected on the token to further enhance security.

In accordance with some embodiments of the present invention, a gaming machine accepting tokens to add credits to the machine, may be configured, for example, by logic stored in a memory associated with the gaming machine, to look for player authentication data on a token. Where the token is found to have player authentication data, the machine may prompt a player to validate the player authentication data for the token, for example, by providing a password, PIN, or personal or biometric data associated with the player authentication data on the token via an interface provided on the machine, such as a keypad, touchscreen, scanner (e.g., in the bill validator, for scanning a piece of personal identification, such as a driver's license, player tracking card, or library card), or biometric device, such as a fingerprint scanner, etc. Without such validation, credits may not be added to the machine from the token. Where no authentication data is found on a token, validation would not be required.

As the term is used herein, an entitled token owner is a person that can present the authentication data when prompted. This may be one person, or multiple people for a single token.

The present invention offers numerous variations on token authentication. In one embodiment, the entitled token owner (such as the person who receives the tokens) remains anonymous; this is beneficial for many people who do not want to have their identity known, stored and/or tracked by a casino. In this instance, the authentication data may include anonymous authentication information, such as a hotel room card or PIN number.

Authentication for the present invention may also be turned on/off. 'Private' tokens are those that require authentication before value on the token can be negotiated. 'Public' tokens are those with no authentication requirements, or the security provided by the present invention has been turned off. The designation between public and private can be made in real time by a number of sources. For example, a person may elect to have public tokens and not use security added by the present invention. The person may make this election they receive the tokens at a cash-out kiosk, at a gaming machine, poker table etc. A central server and database that communicates with these locations may store the status of each token designated in this manner. The designation for each token may change in real time, e.g., ownership of the token changes as a result of play at the poker table, or a person walks to a kiosk and changes the designation of their tokens from private to public or vice versa.

In another authentication embodiment, the authentication information is transferable. This allows an entitled token owner to share his private token(s) with select individuals to create multiple entitled token owners for the same token(s). In this case, the person who receives the tokens does not have to be the same person who redeems the tokens, provided that the person who redeems the tokens can present the proper authentication information. For example, the authentication information may include a PIN or password associated with a set of tokens that may be passed to a desired second person by an entitled token owner. This enables a rightful owner to give away or share his secure tokens.

These variations permit a gaming establishment (such as a casino) to control and vary the level of authentication security associated with their tokens. For example, a casino may permit tokens to be: a) tightly owned by a single user who cannot share his authentication information, b) transferred between patrons by sharing authentication information, and/or c) available with no authentication information. A casino patron may elect their level of authentication, or casino personnel may do so for them.

In some embodiments, when a player loses their tokens (or they are stolen), the casino may invalidate the old tokens (for that person and anyone else), and/or give the person new tokens. Thus, a player can be insured for their losses because the chips are associated with their identification and their authentication information.

A casino may thus revoke tokens, if desired. This also provides liability protection for the casino for tokens that have been out of circulation for some time (e.g., 6 months).

The present invention may also be used to prevent unauthorized gambling (such as for under-aged people) by requiring a person's ID to be presented; transactions and a history of transactions can be kept for select people in this manner.

Portable gaming tokens of the present invention find wide use in a gaming property. The same tokens may be used at gaming machines, tables such as poker tables and blackjack tables, restaurants and other businesses associated with a gaming property, etc. In general, tokens of the present invention may be used and redeemed for value anywhere in a gaming property that they can be authenticated or anywhere that traditional tokens can be used.

Figure 2A:
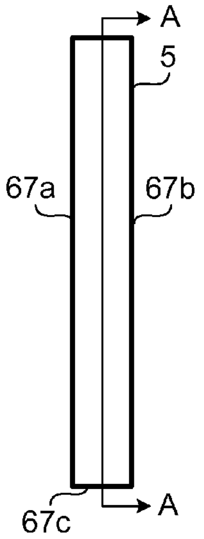
FIGS. 2A and 2B show a portable gaming token suitable for use with the poker table of FIG. 1 in accordance with a specific embodiment of the present invention.
Figure 2B:
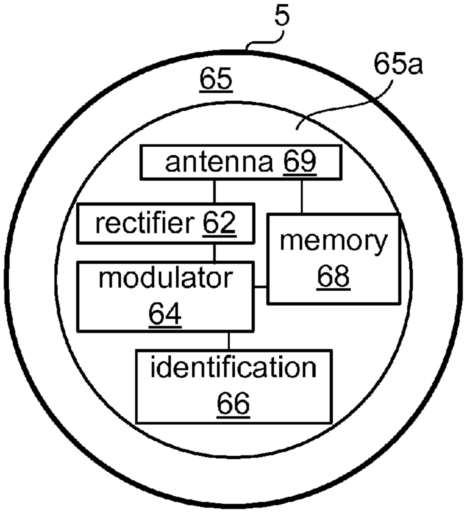

FIG. 1 shows a poker table 2 in accordance with one embodiment of the present invention. Poker table 2 includes a playing surface 3, a set of token readers 4, and a dealer station 7. Numerous tokens 5 rest on playing surface 3. FIGS. 2A and 2B show a portable gaming token 5 suitable for use with poker table 2 in accordance with a specific embodiment of the present invention.

Referring initially to FIG. 1, poker table 2 includes twelve seats 9, lettered A-L, disposed around the perimeter of table 2. Each seat 9 is intended to sit a person that wants to play poker at table 2. Table 2 may include a different numbers of seats 9, such as six, eight or ten.

Table 2 includes multiple token readers 4. Each token reader 4 is embedded below surface 3 (hence the dotted lines in FIG. 1) and monitors the presence of tokens 5 within a local area determined by its interrogation range. For example, a reader 4 positioned on the table for dealer 6, designated $R_{dealer}$, interrogates tokens 5 handled by a dealer. Each seat 9 also includes its own token reader 4, designated $R_{A-L}$, that detects and monitors the presence of tokens for each seat A-L, respectively. A centrally disposed token reader for the table, designated $R_{table}$, detects and monitors the presence of tokens placed within a boundary 8, which conveys that the tokens have been played in a poker hand played at table 2. Boundary 8 corresponds to a range for the table reader 4, and may or may not be actually shown on table 2.

Other token reader configurations are suitable for use with the present invention. In another embodiment, table 2 includes a single token reader 4 that monitors all tokens 5 used on table 2. The single token reader embodiment may use logic to determine who owns or possesses which tokens. As will be described in further detail below, the present invention assigns token ownership to a person by: a) appointing a unique ID number to each token 5, and b) allocating authentication information that corresponds to the identification number and owner. Token tracking software may then monitor ownership of each token on the table, and which tokens 5 each person sitting at a seat owns using the ID number for each token. Moving forward, the readers 4 at poker table 2 will be collectively described together; it is understood that token readers 4 at a table may each be different and perform with varying parameters, such as difference read ranges or frequencies. Further description and operation of token readers 4 will be provided after tokens 5 have been expanded upon.

FIGS. 2A and 2B illustrate an authenticating token 5 in accordance with one embodiment of the present invention. FIG. 2A shows a side view of token 5, while FIG. 2B shows a top cross section of token 5 taken through plane A-A of FIG. 2A. Token 5 includes a body 65, an identification (ID) tag 66, a memory component 68, and one or more communications components. In this instance, the communications components include rectifier 62, a modulator 64, and an antenna 69.

Body 65 includes a rigid material, such as a durable and substantially rigid plastic, that is externally shaped to resemble a coin. Body 65 thus includes two relatively flat faces 67*a* and 67*b* bordered by a circular edge 67*c*. Other token shapes and materials are suitable for use, and size may vary. In a specific embodiment, body 65 is shaped to resemble a coin. Non-circular tokens are also suitable for use. The internal components are embedded within a central portion

65*a* of body 65. More specifically, a central and internal portion 65*a* of body 65 is hollowed to form a cavity in which the remaining components of token 5 are situated. Body 65 includes a durable and substantially rigid material.

Figure 3A:
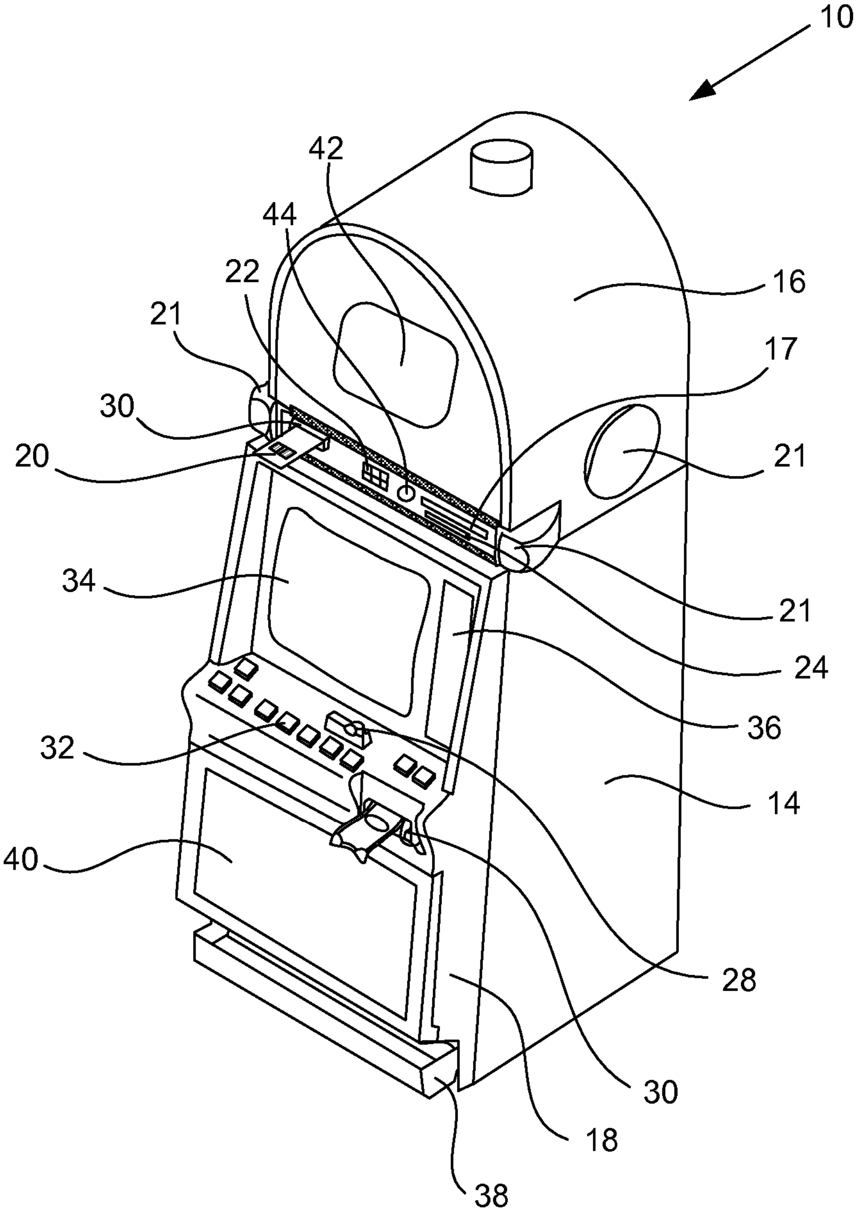
FIG. 3A is a perspective drawing of an exemplary gaming machine in accordance with a specific embodiment of the invention.

Functionally, a wireless probe of token 5 identifies the token relative to other tokens near it. This may occur using any suitable identification technique, such as a unique frequency response from the token or logical enumeration and identification, for example. In a specific embodiment, when probed, token 5 replies with a unique identifier, ID number, or other numeric representation assigned to token 5. The identifier distinctively enumerates each token 5. This allows each token 5 to be distinguished from other tokens 5—as would be encountered when numerous tokens 5 are in a reading range of reader 4 on poker table 2. The unique identifier also provides a means of automatically logging and updating data entry corresponding to the status of each token 5, such as when ownership changes between players at a poker table or when the token is inserted into a gaming machine (FIG. 3A). In one embodiment, token 5 automatically returns an identification signal when probed by token reader 4.

Token 5 includes a wireless communication system. For the embodiment shown in FIG. 2, antenna 69 and modulator 64 serve as a wireless transponder. A transponder functions to receive and transmit wireless signals. The transponder on token 5 receives a wireless signal from token reader 4, and in some embodiments, that signal includes sufficient power to allow transmission of the token's identifier and authentication information back to reader 4. In a specific embodiment, the transponder includes an amplifier for increasing the strength of a received incident signal (from the reader 4 or other actuating device), a modulator 64 for modifying that signal with information provided to the transponder, and an antenna 69 or antennas for receiving and transmitting a wireless signal. Modulator 64 is that part of a transponder that impresses information on a transmitted signal. In some embodiments, the interrogation and energizing signals are separate entities. In other embodiments, they are provided by the same means for simplification purposes, or may include an amplifier to facilitate signal transmission. Other transponder designs are appropriate for use with authenticating tokens 5 of the present invention.

In one embodiment, reader 4 provides power to token 5. The power may be transmitted by RF waves, for example. Rectifier 62 rectifies the incoming signal, thereby providing sufficient DC voltage to operate any digital circuitry in token 5.

The transponder is functionally coupled to identification 66 in a manner giving it access to the identification 66 during probing by token reader 4. Various types of identifier tags 66 may be used with token 5. Examples of suitable ID tags 66 include microchips storing an ID code (e.g., an EPROM), magnetic recording devices, and the like.

Memory 68 stores information for token 5, such as an authentication data as described herein. Memory 68 may also include other information, not limited to: information relevant to a gaming property (e.g., casino name or identifying number); use of the token (such as its ownership history); or any other information pertinent to gaming interaction or token 5 usage. Memory 68 may include a digital (e.g., an EPROM) or other form of memory. In another embodiment, token 5 does not include a separate identification 66 and memory 68, and the two are combined into a single memory 68 or identification 66.

Wireless ID tags are commercially known and there exists numerous manufacturers that currently offer a suitable selection of RFID tags. These tags may be either passive (receive energy via a rectified incident signal) or active (include their own power source). Major manufacturers include Texas Instruments of Dallas, Tex., Micron Communications of Boise, Id., and Motorola of San Jose, Calif. One specific commercially available tag is model No. iCLASS embeddable Card as provided by HID of Irvine, Calif.

Tokens 5 and reader 4 use wireless communication that takes place via electromagnetic radiation of one or more appropriate frequencies. Generally, however, token reader 4 and token 5 may be designed to allow any suitable probe signal or carrier (not just RF or other electromagnetic radiation). The carrier should allow token 5 to be probed from a substantial distance and over a wide area. It may also power the transmission of data from token 5 to reader 4. The carrier should also provide sufficient bandwidth to transfer the desired information in a timely manner. Additionally, the modulated carrier may also be sufficiently unique, in terms of frequency or time synchronization, or coding, such that it is distinguishable from the signal provided by nearby tokens 5. Generally, the carrier may be a wave or field or other intangible effector that acts over a distance through one or more medium (air, fluid, solid, etc.) between reader 4 and a token 5. Examples of suitable carriers include RF radiation, microwave radiation, and infrared radiation, electric fields, magnetic fields, and the like. If the system employs RF radiation, the frequency may range between 125 kHz and 5800 MHz and may be provided at a power of between about 7 and 2 Watts, respectively (as specified by the IEEE). In a specific embodiment, reader 4 may operate at an approved frequency at or near that used for an available RFID device; e.g., near 125 kHz in one case and about 13 MHz in another case. Microwave radiation provides another suitable carrier. Generally, microwave provides the same functionality as RF radiation, but at larger ranges. In addition, any approved or regulated band such as the ISM bands at 945 MHz, 5.8 GHz and 2.45 GHz may be used. Reader 4 may also employ a multi-band or multi-frequency source having one frequency to supply power and a second frequency for interrogation, for example.

In operation, and referring back to FIG. 1, each token reader 4 probes tokens 5 in its read range. Reader 4 provides a wireless probe signal that triggers token 5 to respond with its identity and authentication information.

When probed by reader 4, token 5 replies with its ID code (from identification tag 66 or memory component 68) and optionally any authentication data contained in memory component 68. In a specific embodiment, the signal provided by reader 4 also provides the energy for token 5 to reply.

Reader 4 then detects the token 5 reply, and a processor and software at dealer control station 7 converts that reply to signal suitable for transmission a computer system or server (FIGS. 6-9). As mentioned before, the ID code provides a means for the server to automatically log and access data corresponding to individual tokens 5.

Reader 4 is configured to interrogate multiple tokens 5 simultaneously. This allows the reader to interrogate a large number of tokens 5 at table 2. Some identifier tag/interrogation systems are designed to be polled one at a time (serially), while other interrogators are able to poll multiple tokens 5 simultaneously. Communications strategies typically make use of anti-collision and arbitration procedures that control the time when a tag responds to a probe. In a specific embodiment, each reader 4 includes its own processor, control logic, transceiver and interrogator antenna adapted to interrogate multiple tokens 5 simultaneously.

Reader 4 provides a probing signal (and optionally power) to a token 5. In a specific embodiment, each reader 4 provides:

sufficient radiated power to energize each token 5 at a desired read rate, sufficient bandwidth to interrogate numerous tokens 5 in a reasonable amount of time, sufficient sensitivity to accurately obtain a response from each token, processing or interrogation means to discriminate between nearby tokens 5 in its reading range, and a suitable interface to a computer or server to access a token 5 database. Reader 4 can accomplish the first task by transmitting an electromagnetic signal in the form of continuous wave, spread-spectrum waveform, impulse, or coded waveform to energize the tag. One reader 4 suitable for use with the present invention is model No. 3131 as provided by HID of Irvine, Calif. Other readers are suitable for use herein.

A passive token 5 may rectify an incident RF signal coming from reader 4 to provide DC power for internal token processing. In one embodiment, once activated, token 5 modulates the incident carrier with its ID code and provides a modulated backscatter signal. The response signal may be at a frequency different from that of the incident signal. Reader 4 detects this modulated backscattered signal and translates the identification number and authentication data for the token into a suitable format for communication with a server (see FIGS. 6-9).

The LCD in station 7 may include a touchscreen that allows a dealer to indicate transfer of ownership for tokens 5 at table 2, e.g., when someone wins a hand. This also sends a signal to a server (FIG. 6) to update a database entry for each token 5 whose ownership changed. This also changes the authentication information for each token according to its new owner.

Although not shown, the present invention is suitable for other types of tables used in a gaming property. These include: blackjack tables, craps tables, sic bo, roulette and pai gow tables, for example.

Reader 4 is not limited to use at a table. A reader 4 may also be installed in a gaming machine to allow token 5 usage and player authentication at a gaming machine. Alternatively, reader 4 may be flexibly located at one or more kiosks in the casino, or an entry/exit doors to automatically poll tokens 5 entering and leaving the property. In another embodiment, reader 4 is non-stationary and portable, by casino personnel for example, to increase inspection flexibility.

Figure 3B:
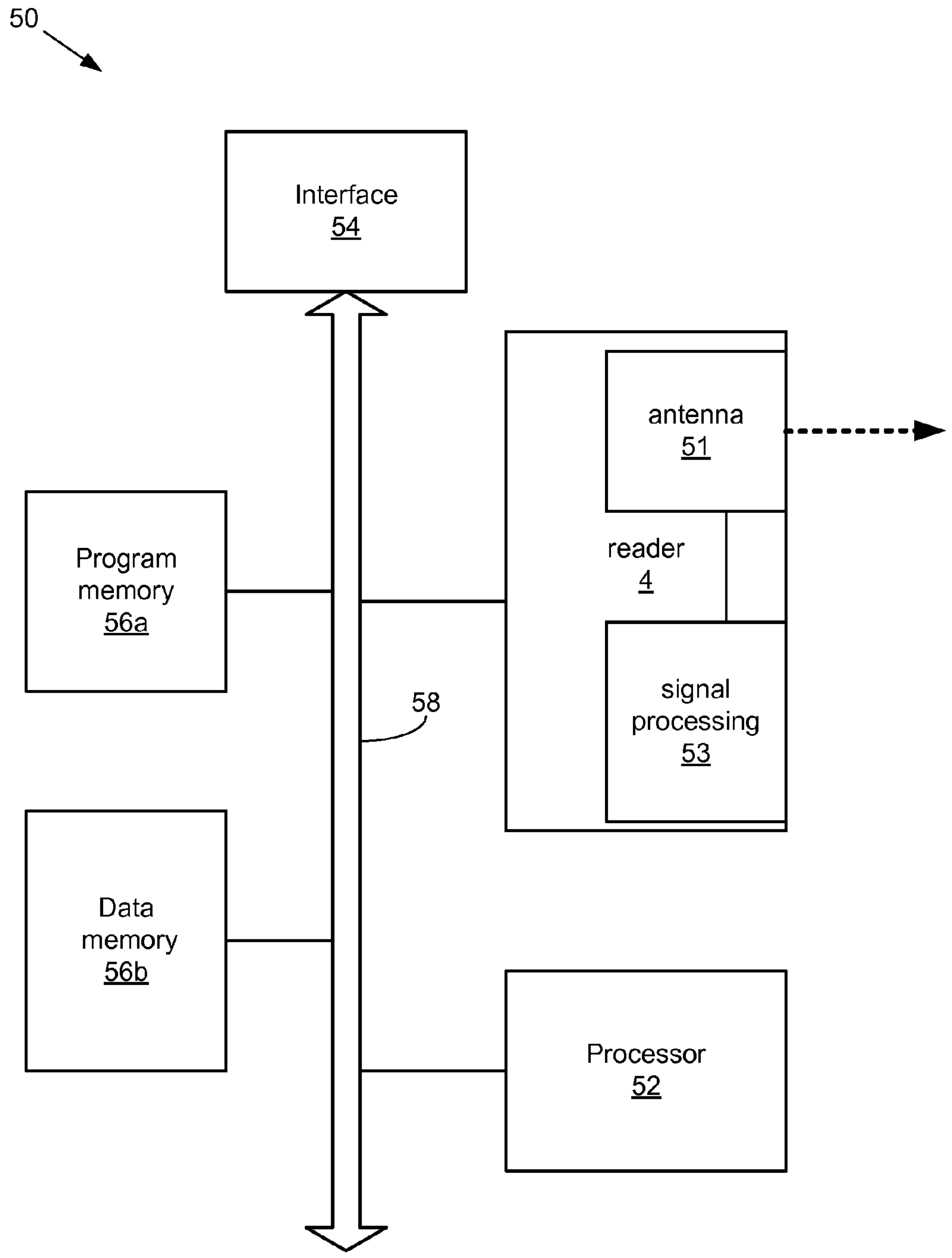
FIG. 3B shows a simplified processing system included in gaming machine of FIG. 3A or table of FIG. 1 in accordance with one embodiment of the present invention.

Turning to FIGS. 3A and 3B, an exemplary video gaming machine 10 is shown. Gaming machine 10 communicates with a reader 4 (FIG. 3B) that wirelessly communicates with tokens 5.

Referring first to FIG. 3A, machine 10 includes an external cabinet 14, which generally surrounds the machine interior and is viewable by users. Cabinet 14 includes a main door 18 on the front of the machine, which opens to provide access to the interior of the machine. Attached to the main door are player-input switches or buttons 32, coin and token acceptor 28, and bill validator 30, coin and token tray 38, and belly glass 40. Viewable through the main door is a video display device 34 and an information panel 36. Display device 34 may include one of more of: a cathode ray tube, flat-panel LCD, a transparent LCD, plasma/LED display, an OLED device or other conventional electronically controlled video display device.

The gaming machine 10 includes a top box 16, which sits on top of the main cabinet 14. A second display device 42 may be provided in the top box 16. Display device 42 may also include one of more of: a cathode ray tube, flat-panel LCD, a transparent LCD, plasma/LED display, an OLED device or other conventional electronically controlled video display device.

Typically, after a player initiates a game on gaming machine 10, the main display device 34 and the second display device 42 visually display a game presentation, possibly including one or more bonus games, and controlled by a main processor (see FIG. 3B). The video component of a game presentation may include a sequence of frames refreshed at a sufficient rate on at least one of the displays, 34 and/or 42, such that it appears as a continuous presentation to a player playing the game on gaming machine 10.

Information panel 36 may be a back-lit, silk screened glass panel with lettering to indicate general game information including, for example, the denomination of bills accepted by the gaming machine (e.g., $1, $20, and $100). Bill validator 30, player-input switches 32, video display device 34, and information panel are devices used to play a game on gaming machine 10. A main processor, housed inside main cabinet 14, controls these devices. During game play, information regarding the operation of one or more of these devices may be captured by gaming machine 10 as part of a game history on the gaming machine.

In the example shown in FIG. 3A, top box 16 houses a number of devices, which may be used to input player tracking information or other player identification information into the gaming machine 10, including printer 30 which may print bar-coded tickets 20, key pad 22, fluorescent display 17, camera 44 and card reader 24 for reading magnetic striped cards or smart cards. Camera 44 may be mounted in top box 16 and used to record images of a person near the gaming machine. Key pad 22, fluorescent display 17 and card reader 24 may be used to enter and display authentication information. In addition, other input devices besides those described above may be used to enter player identification information including a finger print recording device or a retina scanner.

Understand that gaming machine 10 is but one example from a wide range of gaming machine designs on which the present invention may be implemented. For example, not all suitable gaming machines have top boxes or player tracking features. Those of skill in the art will understand that the present invention, as described below, can be deployed on most any gaming machine now available or hereafter developed.

Token acceptor 28 is adapted to receive one or more authenticating tokens from a person. In one embodiment, when a person deposits an authenticating token 5 into token acceptor 28, reader 4 included in gaming machine 10 automatically polls each token and obtains a response signal for each token 5 inserted into token acceptor 28. The response signal may include the token's identification number and/or its authentication data.

A processor in gaming machine 10 then authenticates the person who presented tokens 5 to gaming machine 10. Typically, it does so using instructions stored in memory that: a) prompt the person to input their authentication information for their tokens, and b) compare the authentication data previously stored for the token with authentication data obtained from the person, e.g., using camera 44 and biometric information for the person or requiring the player to input a PIN number on keypad 22.

Once the gaming machine has authenticated the tokens, game play may commence on the gaming machine. Typically, a player may use all or part of the cash entered or credit into the gaming machine to make a wager on game play. During the course of a game, a player may be required to make a number of decisions that affect the outcome of the game. For example, a player may vary his or her wager, select a prize, or make game-time decisions that affect game play. These choices may be selected using the player-input switches 32, a touch screen associated with main video display screen 34 or using some other device which enables a player to input information into the gaming machine including a key pad, a touch screen, a mouse, a joy stick, a microphone and a track ball.

During certain game events, gaming machine 10 may display visual and auditory effects that can be perceived by a player. These effects add to the entertainment and excitement of a game, which makes a player more likely to continue playing. Auditory effects include various sounds that are projected by the speakers 21. After the player has completed a game, the player may receive tokens 5 from coin tray 38 or a ticket 20 from printer 30, which may be used for further games or to redeem a prize. Further, a player may receive a ticket 20 for food, merchandise, or games from printer 30. This information may also be incorporated into game history information or saved in a record of game history.

Many possible games, including video slot games, video poker, video pachinko, video black jack and video keno, may be provided with gaming machines of this invention. In general, the invention may be applied to any type of video game implemented on a gaming machine supporting video game presentations.

Token authentication as described herein employs some form of processing to detect tokens 5 presented to a gaming machine and verify authentication data for the tokens 5. In one embodiment, a gaming machine communicates with a remote server to authenticate tokens 5. In another embodiment, the gaming machine includes its own authentication processing capabilities.

Referring now to FIG. 3B, a simplified processing system 50, included in gaming machine 10 or table 2 of FIG. 1, is shown in accordance with one embodiment of the present invention. Processing system 50 verifies the ownership of the tokens 5. Processing system 50 includes processor 52, interface 54, program memory 56*a*, data memory 56*b*, bus 58, and reader 4.

When acting under the control of appropriate software or firmware, processor (or CPU) 52 verifies the ownership of the tokens 5 as described herein. CPU 52 may include one or more processors such as a processor from the Motorola family of microprocessors or the MIPS family of microprocessors. In an alternative embodiment, processor 52 is specially designed hardware for controlling the operations of a gaming machine. In one embodiment, one of memories 56 (such as non-volatile RAM and/or ROM) also forms part of CPU 52. However, there are many different ways in which memory could be coupled to the processing system.

Interfaces 54 control the sending and receiving of data to and from system 50 (e.g., to a server) and may support other peripherals used with system 50. Suitable hardware interfaces and their respective protocols may include USB interfaces, Ethernet interfaces, cable interfaces, wireless interfaces, dial up interfaces, and the like. For example, the USB interfaces may include a direct link to an infrared camera as described above and a direct link to a host processor in a gaming machine. Bus 58 (e.g., a PCI bus) permits digital communication between the various components in system 50.

In one embodiment, processing system 50 is included in a gaming machine. In this case, processor 52 may represent the main processor or a component control processor included in the gaming machine. In another embodiment, a token authentication system includes a separate hardware module installed on a gaming machine that includes its own processing system 50.

Although the system 50 shown in FIG. 3B is one specific processing system, it is by no means the only processing system architecture on which the present invention can be implemented. Regardless of the processing system configuration, it may employ one or more memories or memory modules (e.g., program memory 56*a* and data memory 56*b*) configured to store program instructions for gaming machine network operations and operations associated with token authentication systems described herein. Such memory or memories may also be configured to store player interactions, player authentication information, biometric and player recognition programs, instructions for one or more games played on the gaming machine, etc. Memory 56 may include one or more RAM modules, flash memory or another type of conventional memory that stores executable programs that are used by the processing system to control components in the retinal image system.

Typically, using a master gaming controller, a gaming machine controls various combinations of devices that allow a player to play a game on the gaming machine. For example, a game played on a gaming machine usually requires a player to input money or indicia of credit into the gaming machine, indicate a wager amount, and initiate a game play. These steps require the gaming machine to control input devices, including bill validators and coin acceptors, to accept money into the gaming machine and recognize user inputs from devices, including touch screens and button pads, to determine the wager amount and initiate game play.

Figure 4:
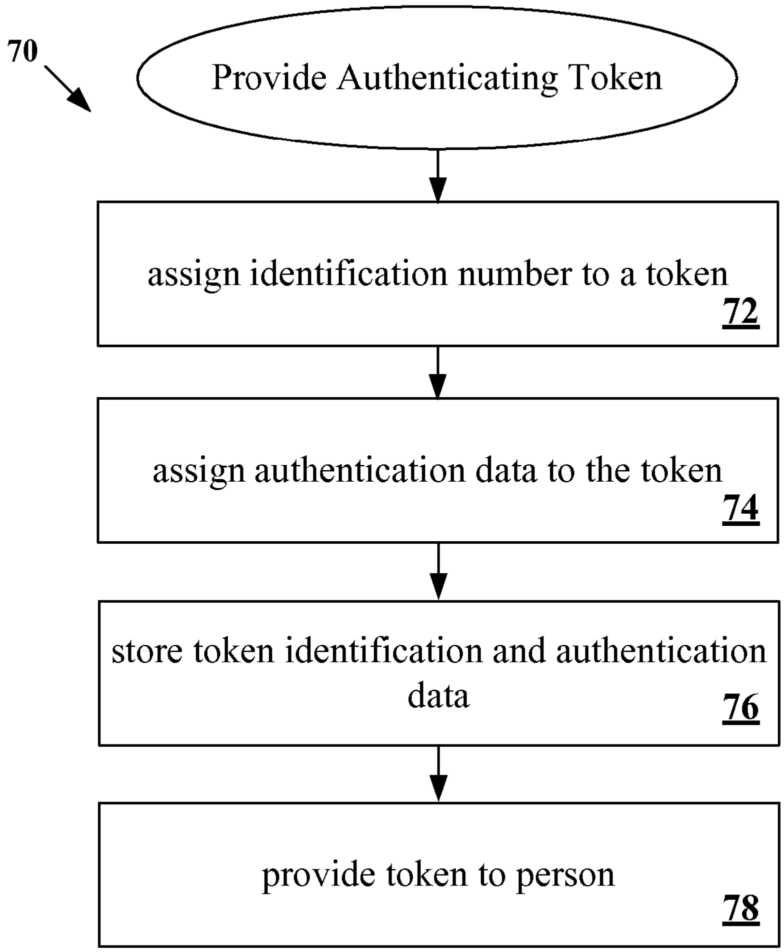
FIG. 4 shows a method of providing tokens in accordance with one embodiment of the present invention.

Having discussed exemplary locations to use a token of the present invention, token authentication methods will now be expanded upon. FIG. 4 shows a method 70 of providing a portable gaming token in accordance with one embodiment of the present invention.

Method 70 begins by assigning an identification number to the portable gaming token (72). The identification may include any suitable identifier or other representation that distinguishes the token from other tokens. Identification assignment may occur before a player requests the tokens, e.g., when the tokens are made or issued to a casino.

Authentication data is subsequently assigned to the portable gaming token (74). The authentication data is designed to limit redemption of value on the token to an entitled token owner that can present the authentication data. The present invention may use one or more forms of authentication. Again, authentication information can be classified into: a) what a person has, b) what a person knows, and c) who a person is. Each of these authentication techniques are suitable for use herein to verify ownership of a portable token, and combinations may also be implemented.

One suitable measure of token 5 authentication relates to verifying an object (or information on the object) carried by the person—or "what a person has". The authentication information in this case then includes description of the object, and in some cases, additional authentication information stored on the object. The authentication object may include a form of personal identification such as a driver's license, state or federally issued identification, birth certificate, or other legal means of identification. In another embodiment, the authentication object is issued by a gaming property and identifies a person carrying the object—relative to the portable token 5—to a reader 4, gaming machine 10, table 2 or casino staff that can read the identifying object. For example, the authenticating object may be a portable gaming instrument issued by the gaming property and carried by a person. This may include a player tracking card, paper ticket or voucher, or smart card, for example. The player tracking card or paper ticket may store additional authentication data, such as a PIN number or biometric data. Before redeeming one or more tokens, a player trying to redeem the tokens presents the authentication object. In such a case, a gaming machine 10 is equipped with a reader that allows a player to insert their identifying device into gaming machine 10 to be read for token authentication. Exemplary printed credit devices include printed-paper tickets and printed plastic cards. Plastic cards including a magnetic strip that stores information are also suitable for use.

In some instances, the authentication object is anonymous, such as a player tracking card with its own unique identification issued by casino to a patron who desires to remain anonymous. Room cards may also be used anonymously, for example.

In another authentication embodiment, the authentication information includes "what a person knows", and token redemption requires a person to enter a password or PIN number or associated with a token 5. The authentication data assigned to the token—for an entitled token owner—then includes a representation of the password or PIN number.

A third authentication measure employs biometric authentication ("who the person is") to validate that the person redeeming the portable token 5 is the person an entitled and rightful owner of a token. Biometrics uses biological information to establish and verify identity of a person. The basic idea behind biometrics is that each person's body contains unique properties that can be used to distinguish the person from others. 'Biometric data' refers to data used to identify a person based on a person's physical trait or behavioral characteristics. 'Biometric identification' refers to the process of identifying of a person based on his or her biometric data. Fingerprint identification is one example of biometric identification, and can be accomplished with an optical scanner and fingerprint software installed on a gaming machine. Facial recognition, retina scans, hand-written signatures, voice patterns and/or palm prints are all forms of biometric identification that are suitable for use herein. The first two may use camera 44 on gaming machine 2 of FIG. 3A, and both allow identification without the user performing any initiating action. Other forms of biometric authentication may also be used. The biometric authentication information may be represented in any manner associated with conventional biometrics.

The authentication information is then stored with the token identification number (76). Typically, the authentication information is converted to authentication data before storage. Given a player authentication technique, the player authentication information is input via an associated interface and converted to the authentication data if not so when presented. The information or data is read and, where appropriate, digitized, encoded, encrypted, and/or stored.

In one embodiment, the identification number and authentication data are stored on the token, which allows token integrity wherever the portable token is read. In a server-based embodiment, the authentication information is stored in a central memory such as a database and associated with the token identification. Player authentication techniques of the present invention may then be implemented in a networked gaming system in which various gaming machines are in communication with a server providing centralized services such as authentication, authentication data storage, accounting, player tracking, etc. In some cases, details of the player authentication and other token usage data (e.g., token value, time and place of issue, etc.) are reported to a centralized system for auditing, accounting or other purposes (see FIGS. 6-9). The authentication information may also be stored in multiple locations.

The token is then provided to the person (78). This may occur at a cash-out station, in a poker room, or at a token tray on a gaming machine, for example.

At a gaming machine, a player pushing a cashout button on the machine typically initiates a cashout event. Among the options available for cashout, tokens may be output into the token tray. In accordance with a specific embodiment of the present invention, when cashout is done by issuance of tokens, a player may select a player authentication technique to add authentication data to his tokens. The player may view token information and authentication options on a video display screen or a player tracking display screen. For example, the gaming machine may prompt the player to select a player authentication technique by an audible query via a speaker or a text query via one of the display screens. Each player authentication technique will have an associated player authentication data acquisition interface by which the player provides some authentication data.

The player will be asked to verify the authentication data on a token in order to redeem the token for cash or other value. For example, a cashier will electronically read encoded authentication data stored for a token and ask the person presenting the token for redemption to confirm the PIN, birth date, or other authentication data.

Figure 5:
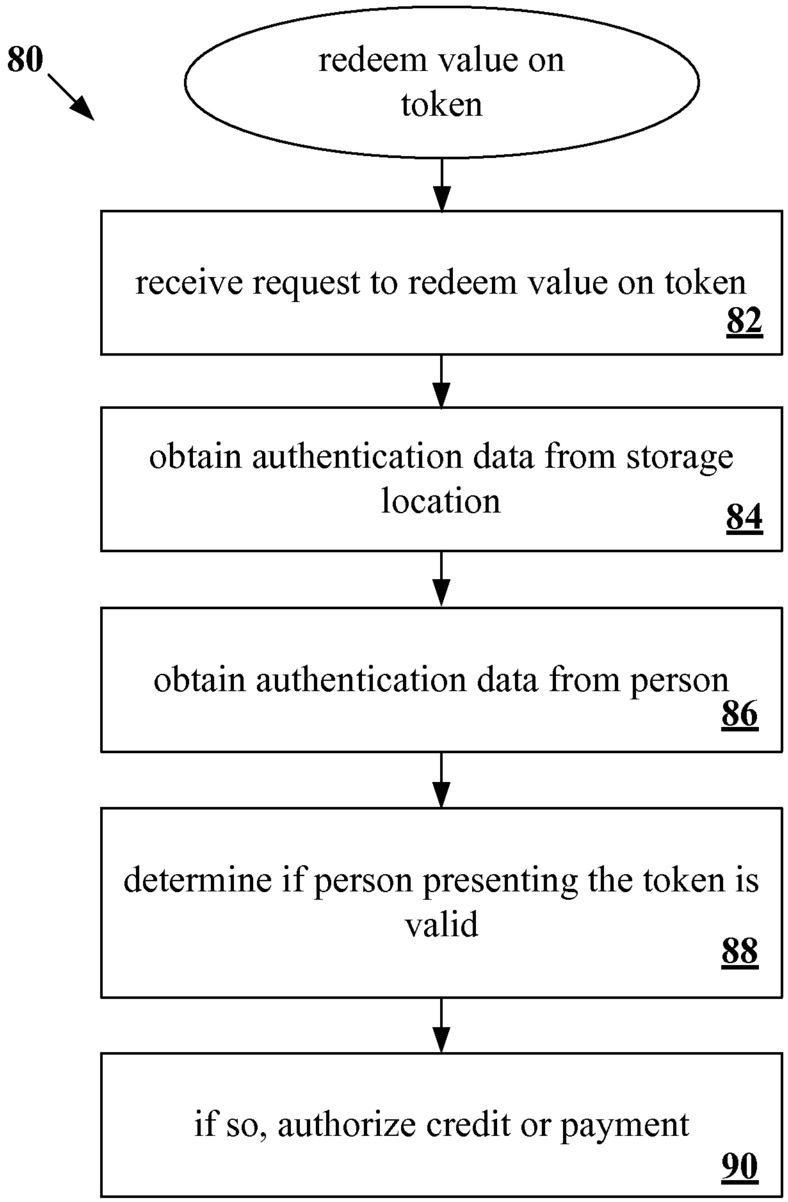
FIG. 5 shows a method of redeeming value on a portable token in accordance with one embodiment of the present invention.

FIG. 5 shows a method 80 of redeeming value on a portable token in accordance with one embodiment of the present invention.

As the term is used herein, 'value' on a token generally refers to any cash or other entitlement assigned to a token. Casino tokens usually include a cash-equivalent denomination of $1, $2, $5, less than $1, or greater than $5. The token may also carry comps and other value. Comps (or 'compensations') refer to awards give to patrons. For example, frequent play can earn a free meal at a local restaurant, frequent patronage at a hotel can earn a free stay at the hotel, etc.

As the term is used herein, a transaction associated with a token refers to any change in value or ownership associated with the value conveyed by a token. This may include giving the token as a tip or using it to buy food in a restaurant, for example. Other examples include redemption of the value by a player at a gaming machine or cashier's station. Redemption generally refers to the process of converting the value on a token to another form. For example, redemption of a cash-equivalent denomination for the token refers to a player requesting cash for the token at a cashier's window, gambling table, or the like. Redemption for game credit commonly occurs when the tokens are used at a gaming machine to play a game. Redemption of comps refers to the processing of converting comp value conveyed by the token to the comp, e.g., tickets to a concert.

Figure 7:
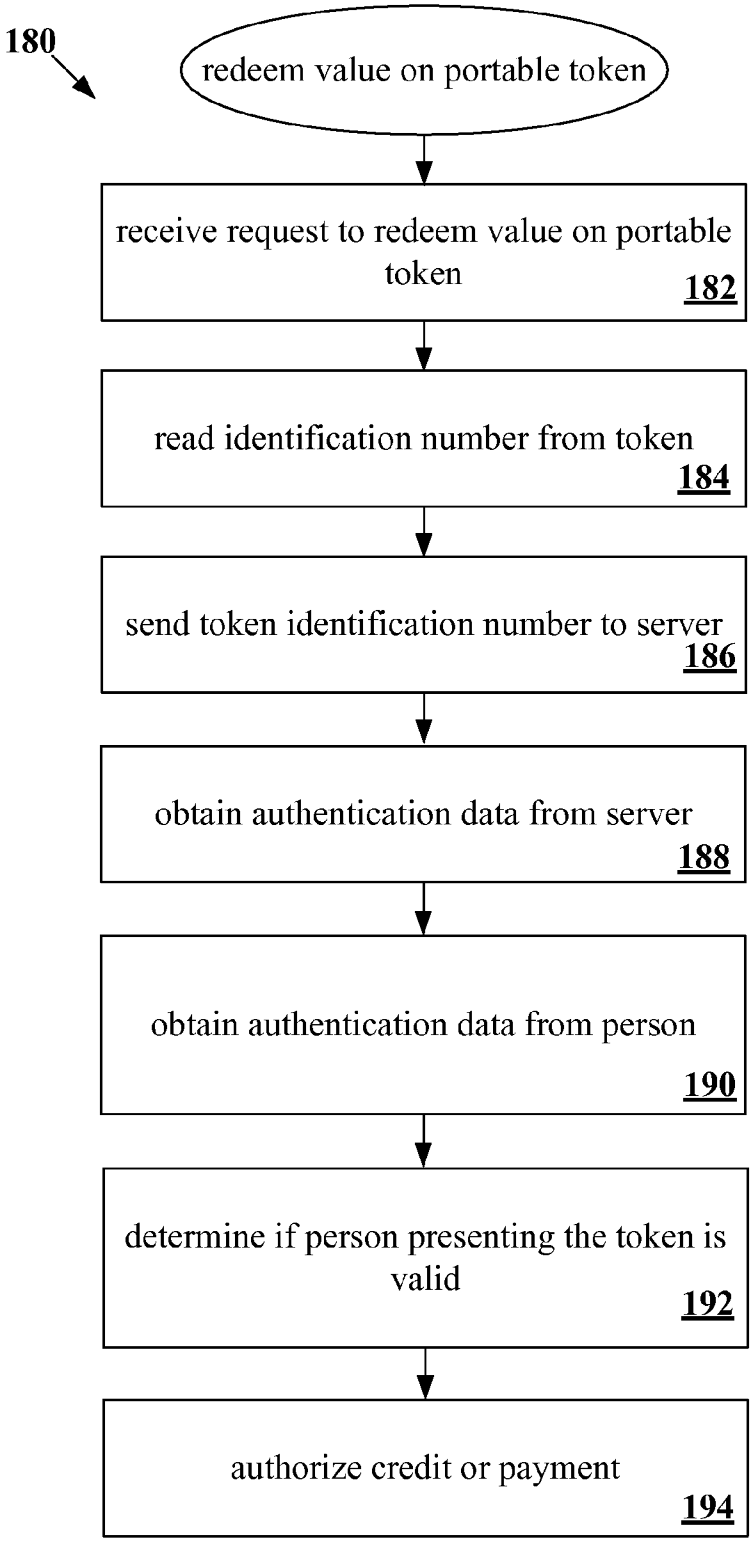
FIG. 7 illustrates a process flow for redeeming value on a token that uses a network architecture and server in accordance with another embodiment of the present invention.

Method 80 begins by receiving a request to redeem value on a portable gaming token (82). This may occur at a gaming machine, a blackjack or poker table, a casino kiosk, a hand-held wireless device, a clerk validation terminal in a networked gaming system, a cash out station in a casino, a cash cage in a casino, a wireless walk around cash out station, or a cash out station associated with a server or system computer. Collectively, these may be referred to as a gaming device that redeems value on a token. In one embodiment, value redemption and authentication uses a server (FIG. 7). For method 80, value redemption and authentication may occur solely at the gaming device (FIG. 5). For example, a gaming machine can be constructed such that a cash out station is part of the gaming machine. This station may not dispense money for a token but instead credits the machine from value of the tokens presented to it and redeemed.

Upon receiving a request for redemption of value on one or more tokens, either for redemption by a gaming machine or at cash-out, authentication data is used to verify the person requesting the redemption. The verification compares a)

authentication data stored for the token with b) authentication data presented by the person upon redemption.

To do so, the gaming device first obtains the authentication data for the token from its storage location (84). As mentioned above, the authentication data may be stored local on the token and/or in a central server. A reader local to the gaming machine reads the authentication data from the token in the former case.

The gaming device then obtains authentication information or data from a person trying to redeem value on the token (86). For example, the gaming device may prompt the user for their biometric information. If the token includes fingerprint authentication data, then the gaming device obtains fingerprint information using a fingerprint reader included therewith, and converts the fingerprint information to fingerprint data using an algorithm that was used to produce the fingerprint data on the token. Alternatively, after inserting the tokens into a gaming machine, the player may be visually prompted on a display screen or aurally prompted using a speaker to enter identification information such as a personal identification number (PIN) using the key pad 22. In addition, a player tracking card may remain in a card reader 24 during a game play session, which permits continuous authentication of tokens if any data on the player tracking card is used for validation. As another example, the gaming machine may transfer player tracking information from a portable wireless device worn by the player via a wireless interface device on the gaming machine 2. An advantage of using a portable wireless device is that the transfer of player tracking information is automatic and the player does not have to remember to correctly insert a player tracking card into a gaming machine.

Player authentication data can be obtained and entered manually using a PIN, birth date or other information for identity confirmation, via a keypad. As noted above, the keypad used may be one that is dedicated to the player authentication purpose, or one that is available to receive input for a variety of purposes including player tracking, wagering, etc. In a preferred embodiment, the keypad provided in many conventional player tracking units may be used as a player authentication data interface in this way. This numeric or alphanumeric data can be read, stored, processed, and/or encoded (e.g., converted to barcode), and/or encrypted for data storage.

Another player authentication data interface that may be used is a touchscreen. For example, display 34 may be equipped with touchscreen technology to allow the display to receive input as well as provide output. In one embodiment, a player could enter her signature using the machine touchscreen. The signature could be converted to a digital image by the gaming machine and then stored for a token. This signature can then be compared to the player's previously entered digitally stored signature filed with the gaming machine operator (e.g., casino), or to the signature on the player's driver's license if there is no previously recorded signature, when the token is presented to a cashier for redemption.

Player authentication data may also be input via a conventional gaming machine component configured for the task by logic. For example, a machine's bill validator may be configured to scan a player identification card, such as a driver's license or library card. The data so acquired may be used for authentication purposes.

Other interfaces for obtaining player authentication data include various biometric devices, such as fingerprint scanners, iris scanners, digital cameras (for acquiring a picture for image comparison or ratiometric (feature recognition) analysis), and/or a microphone (to obtain a digital file (signature) of the player's voice containing unique voice characteristic data), which collect player authentication data. In each case, the appropriate biometric interface is incorporated into the gaming machine and available to collect player authentication data that is then digitized and/or encoded for a token.

While several player authentication data acquisition interfaces and techniques have been described above, it should be understood that any data acquisition method and apparatus suitable for acquiring a player authentication data so that it may be stored and later authenticated consistent with the principles of this invention.

Further, player authentication of tokens in accordance with the present invention may be advantageously integrated with player tracking systems in a gaming machine. The use of player tracking unit components such as keypads and biometric devices to collect player authentication data is known. In addition, data from a player's player tracking card (name, picture, barcode data matrix, etc.) may be selected by a user to authenticate his tokens. In this embodiment, the player is identified to the gaming machine and associated system at the start of the gaming session by insertion of a player tracking card. Player authentication data on the player tracking card may be sufficient for player authentication in accordance with the present invention and obviate the need to prompt the player to select a data acquisition technique at cashout.

Method 80 then compares: a) the authentication data obtained from the person trying to redeem the value on the token with b) the authentication data stored for the token (88). In general, the definition of who is valid or acceptable at redemption is a matter of design and implementation choice. For example, a PIN number may need an exact match, while biometric data may require a reasonable match as dictated by the biometric software and operator control.

The present invention contemplates multiple levels of security for a token that determine who is entitled to redeem value on the token. Suitable authentication levels include: single authentication, collective authentication, and no authentication.

'Single authentication' refers to assigning a single person as the entitled and rightful owner of a token. Biometric information and passwords are well suited for single authentication. When a token changes owners, e.g., at a poker table when a hand is lost, the previous owner is not able to redeem the token.

'Collective authentication' permits a group of people to redeem value on a token. Collective authentication is useful as a service in many gaming establishments when multiple people are of a common or trusted group. For example, portable tokens 5 may be given to each member of a family; in this case, each member of that family may redeem tokens given to others in the family. In another specific embodiment, tokens given to roommates at a hotel/casino are redeemable by each person in the room (e.g., using their room card). Collective authentication may also be customized. For example, a person may designate one or more people (friends, etc.) who can redeem their tokens.

'No authentication' implies that security features described herein have been turned off. This allows casino patrons and personnel to waive authentication and security measures described herein. This may be done when the tokens are received at a cash-out station, for example, or when received from a gaming machine or other source.

As the term is used herein, an 'entitled token owner' refers to a person who is able to provide the authentication information for an authenticating token of the present invention. The entitled token owner may refer to a single authentication person, a person in a collective authentication group, or anyone who rightfully received transferable authentication information and presents the authentication information when requested. This person may change, e.g., when the authentication information includes a card (what the person carries) that intentionally changes ownership. System designers and casino operators may tailor how strict the authentication information is for each token. A less strict embodiment is when the authentication information includes a portable device that can be transferred between casino patrons, e.g., a room card or player tracking card. A stricter embodiment includes a single authentication designation where the authentication information cannot be changed and includes biometric information. Casino operators may ask a patron what level of security they desire, and set this level when the tokens are given to the patron. The authentication information is valid when it meets the predetermined rules for acceptance (88). Typically, these are programmed as instructions for the system.

If the redeeming person cannot provide the authentication information, then the value on the token is not redeemed. When the authentication information is valid, then the gaming device awards value on the token to the person (90). Any discrepancies between the stored authentication data and the authentication information obtained from the person trying to redeem the value on the token may be investigated. In this manner, anyone other than the entitled token owner may be detected, and investigated if desired.

The present invention is well suited for server-based gaming in which a centralized server manages an authentication process for tokens. Networked systems and methods may thus employ a centralized server that maintains authentication data and records for tokens. The server offers remote validation of portable tokens provided to a processing system 50 (FIG. 3B) included in a gaming machine (FIG. 3A) or table (FIG. 1) that communicates on the network.

Figure 6:
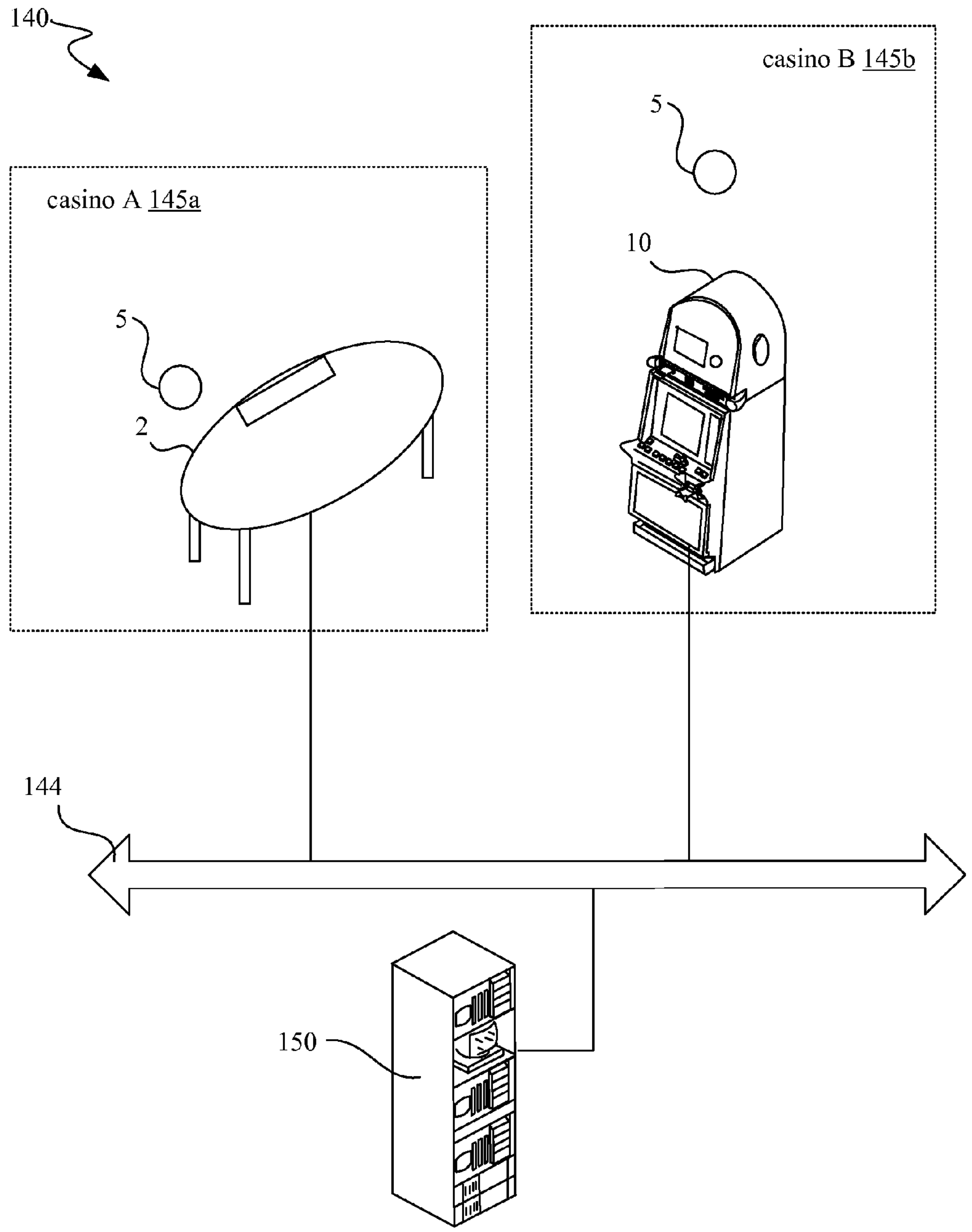
FIG. 6 illustrates a gaming network in accordance with a server-based embodiment of the invention.

FIG. 6 illustrates a gaming machine network 140 in accordance with a server-based embodiment of the invention. System 140 includes one or more gaming machines 10 at a particular location 145*a*, one or more tables 2 at the same or another location 145*b*, a communication line 144, and a central server 150.

The gaming machines 10 and tables 2 communicate with server 150 electronically via communication line 144, which may include any conventional data transmission technology. Suitable communication lines 144 (in part or in whole) include DSL links, T1 lines, Internet links, optical links, satellite, and combinations thereof. In general, the communication line 144 should allow communication between server 150 and a gaming machine or table.

Each gaming machine 10 and table 2 allows a player to play a game, and exchanges value and rewards, monetary or otherwise, as appropriate. The configuration of system 140 encompasses embodiments in which server 150 controls the operation of gaming machine 10. The system 140 also encompasses embodiments in which gaming machine 10 is a stand-alone unit capable of operating play of its games largely without server 150 and server 150 only adds extra services such as authenticating tokens. Various embodiments of the invention can also be used within systems that have multiple networked gaming machines 10.

When a person attempts to redeem value on portable token 5 at gaming machine 10 or table 2, the server based system 140 validates the person trying to redeem the tokens. Server 150 does this by verifying authentication data assigned to the token(s) 5 that the person is trying to redeem. In one embodiment, this verification begins by assembling a central database with an entry for each token 5. Subsequently, when someone requests to redeem value on a token 5, verification of the authentication information is made by comparing a) authentication information obtained from the person to b) database contents for one or more tokens they are trying to redeem.

System 140 may spread across one or more gaming properties 145. As the term is used herein, a gaming property refers to any business or organization that operates at least one gaming machine on its premises and/or offers gaming machine services to potential customers. Exemplary establishments that operate gaming machines on their premises include casinos, hotels, airports, restaurants, nightclubs, grocery stores, gas stations and convenience stores, for example.

Gaming properties 145*a* and 145*b* may be spread across a city, state, country, or internationally. Properties 145*a* and 145*b* may be owned by different operators, or the same operator (e.g., Harrah's owns casinos in many states).

In one embodiment, server 150 is operated or owned by a banking or credit organization that authenticates tokens and provides cash for valid tokens as it would other financial services it provides, such as services provided for traveler's checks and credit cards. The banking organization may be publicly owned (e.g., a credit union) or privately owned; the credit organization may similarly be publicly owned or privately owned (e.g., MasterCard or some other trusted name for financial services). In this case, the same tokens can be played across multiple gaming properties, multiple geographic areas, for gaming machines and tables of different manufacturers, etc.

The present invention also contemplates server-based methods of authenticating the ownership of tokens. FIG. 7 illustrates a process flow 180 for redeeming value on a token that uses a network architecture and server in accordance with another embodiment of the present invention.

Process flow 180 begins by receiving a request to redeem the value on a token (182). The gaming device that received the request reads an identification number for the token (184) and transmits the number to a server (186). The server then accesses a memory that stores authentication data for each token, and retrieves authentication data for the token in question using its identification number (188). Server and network-based redemption permits flexible options for patrons of a gaming establishment to redeem value on a token. A player may redeem any value on a token at a gaming machine, a cash-out window or a pay machine that communicates with the server, for example. When a token is redeemed at a cash-out window, the cashier may verify the token by running the tokens over a reader 4 that wirelessly detects an identification number for each token.

The person's authentication information or data is also received (190). For biometric authentication information, this may occur using a fingerprint scanner or other biometric reader, for example. Alternatively, a player may be prompted to insert a player tracking card into a gaming machine; the gaming machine then reads authentication data from the player tracking card, such as its serial number or the person's name.

The stored authentication data from server memory is then compared to the authentication data obtained from the person (190). In one embodiment, validation occurs at the gaming device and the server sends the authentication data from the server memory to the gaming device.

In another embodiment, the server compares the server authentication data and authentication data obtained from the person. In this case, the person's authentication data is sent via a network interface from the gaming device to a server for the gaming network. The server receives this data and uses it to determine if the person is an entitled token owner (192).

When the authentication information is valid, then the gaming device or server awards value on the token to the entitled token owner (194). If the authentication request occurs at a gaming machine, the person will be credited the corresponding amount on the gaming machine and the server sends this validation to the requesting gaming device. If the authentication request occurs at a cashier's station, the entitled token owner may be paid with the corresponding amount according to the cash out value stored on the token(s). If the authentication information does not match, the transaction is prevented, and the discrepancy may be logged and investigated.

The server-based authentication systems are useful to centrally store and manage the status of each token in a system. This may correspond to all tokens used a gaming property such as a casino, for example. This permits both central control—and central tracking—of token usage.

Data storage for a server-based system uses a memory with the authentication data arranged in a logical manner. A database is well suited for many applications. In another embodiment, a look-up table is used. Other logical data storage systems are suitable for use.

FIG. 8 presents an exemplary logical representation of a database 500 for storing authentication data and other information for a large number of tokens in accordance with a specific embodiment of this invention. Database 500 includes a number of records 501, each relating to an individual token. Each record 501 may also be referred to as an entry for database 500.

In one embodiment, the present invention enumerates each token and assigns each token an identification number that distinguishes the token from other tokens. In a specific embodiment, this is done in a unique manner such that no two tokens have the same identification number. The identification number may correspond to a number given to an RFID device used with each token. In another specific embodiment, the identification number includes a primary key used with a database. For FIG. 8, a primary key 502 uniquely identifies each record 501, and assigns a number to each token. Each record 501 also includes a number of fields 504-512.

A current owner field 504 indicates who currently owns a particular token 501. This may change when a person is issued the token by a casino, or when the token changes hands at a poker table, for example. This may also change fields 508 and 512. As shown, the ownership may correspond to a name or number. The number may be anonymous or associated with an alternative form of identification (e.g., the number relates to a player tracking account).

It should be noted that, in accordance with some embodiments of the present invention, player authentication data may be anonymous. The number used for ownership in field 504 then acts as an alias. The player authentication data for a token may thus not convey any personal information, and so may not identify the player as a particular person, thereby preserving the player's privacy. For example, a player may input a password or PIN via a keypad on the machine as her player authentication data. This data may be stored for that person and their tokens. Then, the player may validate and redeem the instrument for cash by providing the password or code to the kiosk or cashier to identify herself as the owner of the tokens, without revealing personal identity.

Value field 506 indicates the redemption value of each token. In one embodiment, the value comprises cash value or game credit on a gaming machine.

An authentication status field 508 indicates the level of security on each token. This may be set for example when the person receives their tokens.

A location field 510 indicates where the token was last detected. Readers in a casino may track and update field 510 on a regular basis.

An authentication data field 512 indicates what data is needed to redeem each token. Field 512 will change and update each time the token changes its authentication status or owner.

Other fields may be included for each token record. A 'casino ID' field may be used to identify the token's issuing casino. An 'issue date' or 'issue time' field lists when the token was issued by a casino. An 'ownership date' or 'ownership time' field lists when the token was obtained by its current owner. An 'expiration date' field indicates when the token is no longer valid; this is particularly useful for casinos to reduce the liability of uncashed tokens. A 'special promotions' field allows casino operators to provide special services through the tokens; for example, a casino may advertise that all tokens are worth double value on certain gaming machine at a certain time (e.g., Nickelmania or I love Lucy between 1 and 3 AM) to induce play of select games or gaming machines or to increase patronage at certain times or locations in a casino. A 'player tracking' field permits the database to ties each token to a person's player tracking identity. A 'public/private' field allows the token owner to designate their anonymity in the system and whether their gaming information may be disseminated.

Information for each token may change each time ownership of the token changes. Tokens may be provided to players at ATM like terminals, at a cashier station when a player cashes out or tokens may be purchased within the gaming property (e.g. casino), at gaming machines and tables, etc.

In one embodiment, the database uses a relational database. This allows a casino operator to call specific items in the database for easy analysis. For example, the casino operator may track the ownership history of each token, e.g., who owned the token and/or where it was used over the course of a year.

The present invention also enables an audit trail of token transactions for each token to be created, automatically updated and maintained, and checked as desired. That is, a database may maintain a history of the transactions for each token so that the ownership of each token can be traced. For example, the transaction may allow casino personnel to determined that: player A lost the token in a poker game, player B won the token, and later player B gave the token to the dealer as a tip.

Central tracking using a server allows a casino to monitor how much money or tokens a person has. For example, a casino operator may probe the database as to how much money patron "John Doe" has. This is useful to determine when the person triggers a level of service form the casino. For example, some jurisdictions such as Missouri currently limit how much a person can lose in a single day. The present invention allows a casino to disable a person's tokens when they lose a certain predetermined limit. This service may also be automated. Alternatively, when a person wins a predetermined amount at a particular table, the event may be flagged. At a blackjack table for example, this allows the casino to change dealers, offer comps such as free drinks, etc.

Central tracking using a server also allows a casino to track how much money is in a casino, and where the money is in the casino. "Live counts" of how much money is on a casino floor are difficult to do in real time when the money is in cash form and on poker tables. The present invention, however, permits real time counts based on the current ownership and token location in the database. This may be automated and done periodically for casino financial tracking, for example, and discrepancies logged. Casinos are also expected to have a certain amount of reserve cash, such as 2% of all monies on the casino floor; the present invention permits a casino to tune the reserve cash to what is currently on the casino floor, thereby releasing spare funds for other purposes.

In addition, the location field allows a casino to track where money is in the casino, e.g., how much is at the poker tables.

Information from the fields may be combined. For example, a casino may offer customer care where they provide free drinks, food and other services to those who spend a lot of money. The drinks and food can be brought to the player's location as last recorded in the database for his tokens.

Information in the database may also be used to plan or change a casino floor plan based on known people and money movements. Such information is particularly valuable to a casino when trying to maximize floor revenues by adapted floor plans.

Figure 9:
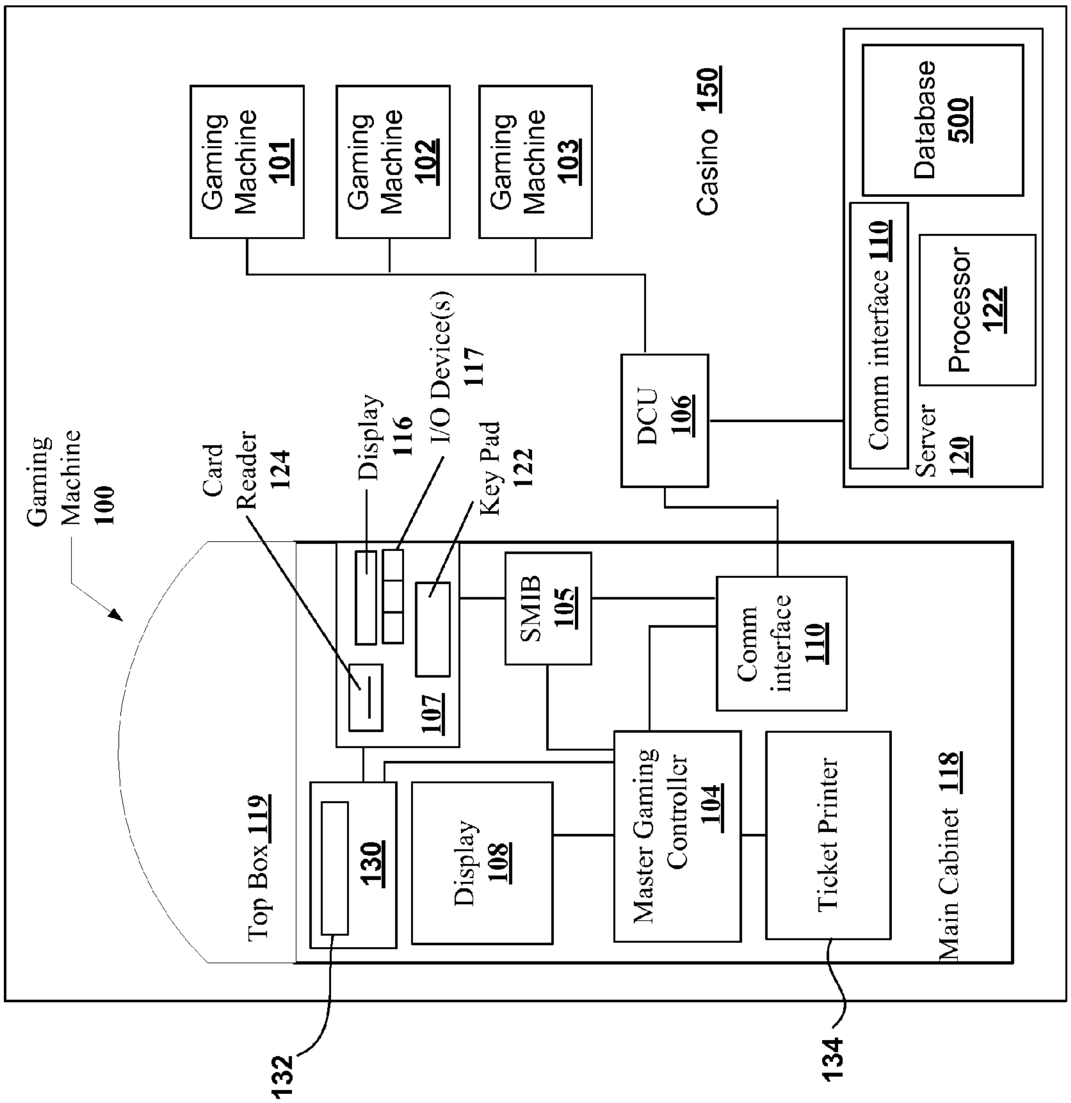
FIG. 9 shows a block diagram of a number of gaming machines connected to a server providing associated services, such as accounting, player tracking and player authentication.

FIG. 9 shows a block diagram of a number of gaming machines connected to a server 120 providing associated services, such as accounting, player tracking and player authentication. In casino 150, gaming machines 100, 101, 102 and 103 are connected, via the data collection unit (DCU) 106 to the server 120. The DCU 106, which may be connected to up to 132 player tracking units as part of a local network in a particular example, consolidates the information gathered from player tracking and player authentication units in gaming machines 100, 101, 102 and 103 and forwards the information to the server 120. Among the functions of the server are 1) to store player tracking account information, such as information regarding a player's identity and previous game play, 2) to calculate player tracking points based on a player's game play that may be used as basis for providing rewards to the player, 3) store player authentication data for multiple tokens used in casino 150, and 4) other marketing and promotional purposes.

In gaming machine 100 of casino 150, a master gaming controller 104 controls various combinations of devices that allow a player to play a game on the gaming machine and also encourage game play on the gaming machine, etc. It should be noted that in other embodiments, one or more other intelligent devices in a gaming system network may control one or more of the machine devices. The master gaming controller 104 is connected with a main, usually video, display 108, with a player authentication unit 130 and with player tracking unit 107 via a main communication interface or interface board 110 and a slot machine interface board (SMIB) 105, all of which are mounted within a main cabinet 118 of the gaming machine. The machine also includes a ticket printer 134, interconnected as a peripheral with the other components of the gaming machine 100, which may print bar-coded tickets or vouchers. The printer may be a stand alone component, or may be part of one or more functional units of the machine 100, such as the player tracking unit 107 or the player authentication unit 130. The player authentication unit also includes one or more player authentication data acquisition devices 132. In the illustrated embodiment, the player authentication features of the present invention are depicted as being implemented as a discrete player authentication unit 130 interconnected as a peripheral with the other components of the gaming machine 100. The player authentication features may also be implemented as part of one or more other components of the machine, in particular the player tracking unit. When both are present, the player authentication unit 130 and the player tracking unit may be directly connected so that they may more easily share I/O devices and drivers and data. A top box 119 is mounted on top of the main cabinet 118 of the gaming machine. Player authentication and/or player tracking units may be mounted within the top box 119 or the cabinet 118, or may be mounted externally.

The player tracking unit 107 includes a variety of player tracking devices, including a card reader 124, a key pad 122, and a display 116, usually a vacuum fluorescent display (VFD) or liquid crystal display (LCD), all mounted within the unit. Other player tracking I/O devices may also be used, as represented by 117, for example, various biometric devices such as a digital camera, a microphone, or a fingerprint or iris scanner. As noted above, these player tracking devices may also be used to acquire player authentication information for use in a player authentication system in accordance with the present invention. The I/O devices are used to input player tracking information that is needed to implement the player tracking program and to acquire player data needed to implement the player authentication system. The player tracking unit 107 communicates with the server via the SMIB 105, a main communication board 110 and the data collection unit 106. The SMIB 105 allows the player tracking unit 107 to gather information from the gaming machine 100 such as an amount a player has wagered during a game play session. This information may be used by the player tracking server 120 to calculate player tracking points for the player. The player tracking 107 and player authentication units (whether two separate units or integrated as one) are usually connected to the master gaming controller 104 via a serial connection of some type and communicate with the master gaming controller 104 using a communication protocol of some type. For example, the master gaming controller 104 may employ the Slot Accounting System (SAS protocol) developed by International Game Technology of Reno, Nev. to communicate with the player tracking and authentication units.

The player authentication unit may include a logic device having a processor for executing software allowing the unit to perform various player authentication functions such as communicating with the server 120, communicating with the master gaming controller 104 or operating the various peripheral devices such as the authentication data acquisition device (s) 132 and the printer 134. In one embodiment, application software for the player authentication unit and configuration information for the player authentication unit may be stored in a memory device such as an EPROM, a non-volatile memory, hard drive or a flash memory.

The player authentication unit 130 may include a memory configured to store: 1) player authentication software such as player authentication data collection software, 2) player authentication communication protocols allowing the player authentication unit 130 to communicate with different types of servers (e.g., 120), 3) device drivers for many types of player authentication data acquisition devices (e.g. 132), 4) biometric (e.g., fingerprint, iris or voice recognition) software for acquiring and processing data from the device(s) 132, 5) a secondary memory storage device such as a non-volatile memory device, configured to store gaming software related information (The gaming software related information and memory may be used in a game download process or other software download process), and 6) communication transport protocols such as TCP/IP, USB, IEEE1394, Bluetooth, IEEE 802.11x (e.g., all IEEE 802.11 standards), HiperLAN/2, and HomeRF allowing the player authentication 130 unit to communicate with devices using these protocols or communication protocols allowing the logic device to communicate with different types of master gaming controllers (e.g. master gaming controllers using different types of communication protocols), such as 104. Typically, the master gaming controller, such as 104, communicates using a serial communication protocol. A few examples of serial communication protocols that may be used to communicate with the master gaming controller include but are not limited to USB, RS-232 and Netplex (a proprietary protocol developed by IGT, Reno, Nev.).

A plurality of device drivers may be stored in memory for each type of player authentication data acquisition peripheral device. When one type of a particular peripheral device is exchanged for another type of the particular device, a new device driver may be loaded from the memory by the processor to allow communication with the device.

Server 120 includes a processor 122 that runs authentication methods as described herein. These methods are often implemented as program instructions stored in one or more memories. Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher-level code that may be executed by the computer using an interpreter.

While this invention has been described in terms of several preferred embodiments, there are alterations, permutations, and equivalents that fall within the scope of this invention which have been omitted for brevity's sake. It is understood that the present invention need not include one or more heat transfer appendages. It is therefore intended that the scope of the invention should be determined with reference to the appended claims.

What is claimed is:

1. A method of providing a portable gaming token, the method comprising:

assigning an identification number to the portable gaming token;

assigning authentication data to the identification number wherein the authentication data corresponds to security information obtained from an entitled token owner of the portable gaming token, the security information selected from first biometric information associated with the entitled token owner, information that the entitled token owner knows, and authentication information stored on an authentication object that the entitled token owner possesses, where the authentication data is assigned to the portable gaming token for security to restrict transactions of value with the portable gaming token in game play on a gaming machine, game play at a gaming table, and redemption for cash or prizes to the entitled token owner who can present security information corresponding to the authentication data for verification in order to authorize negotiation of the portable gaming token for value, wherein presenting the security information includes the entitled token owner presenting the authentication object;

storing the assigned authentication data and the identification number;

providing the portable gaming token to the entitled owner of the portable gaming token from whom the security information is obtained, and providing value to the entitled owner in a transaction for value with the portable token wherein the entitled owner surrenders the portable gaming token to complete the transaction.

2. The method of claim 1, wherein the authentication data and the identification number are stored together in a memory included in the portable gaming token.

3. The method of claim 1, wherein the authentication data and the identification number are stored together in a central memory for a server in a gaming system.

4. The method of claim 1, wherein the portable gaming token is provided to a person at a gaming machine configured to present one or more games of chance.

5. The method of claim 1, further comprising receiving the security information from the entitled token owner that is used to generate the authentication data.

6. The method of claim 1, wherein the authentication data is transferable between the entitled token owner and a second person.

7. The method of claim 1, wherein the authentication data identifies security information carried by an entitled token owner.

8. The method of claim 1, wherein the authentication data identifies security information known by an entitled token owner.

9. The method of claim 1, wherein the authentication data includes biometric information.

10. A method for redeeming value on a portable gaming token, the method comprising:

assigning an identification number to the portable gaming token;

assigning authentication data to the portable gaming token wherein the authentication data corresponds to security information obtained from an entitled owner of the portable gaming token, the security information selected from first biometric information associated with the entitled owner, information that the entitled owner knows, and authentication information stored on an authentication object that the entitled owner possesses;

storing the assigned authentication data and the identification number;

receiving a request to redeem at least a portion of the value on the portable gaming token in game play on a gaming machine, game play at a gaming table, or redemption for cash or prizes;

receiving second security information selected from biometric information associated with the entitled token owner, information that the entitled token owner knows, and information stored on the authentication object that the entitled owner possesses;

verifying that a person is the entitled token owner of the portable gaming token using the received second security information by comparing the received second security information to the authentication data, wherein the comparison includes comparing the information stored on the authentication object to the corresponding authentication object information assigned to the portable gaming token obtaining; and authorizing the value in a transaction for value with the portable gaming token wherein the entitled owner surrenders the portable gaming token to complete the transaction if the person is verified as an entitled token owner.

11. The method of claim 10, wherein the authentication data and the identification number are stored together in a memory included in the portable gaming token.

12. The method of claim 10, wherein the authentication data and the identification number are stored together in a central memory for a server in a gaming system.

13. The method of claim 10, wherein the request is received at a gaming machine configured to present one or more games of chance.

14. The method of claim 10, wherein the authentication data is transferable between a first person and a second person.

15. The method of claim 10, wherein verifying that the person is an entitled token owner includes a biometric challenge to obtain the security information.

16. The method of claim 10, wherein verifying that the person is an entitled token owner includes verifying personal knowledge for the person to obtain the security information.

17. The method of claim 16, wherein the personal knowledge includes one of a PIN number or password.

18. The method of claim 10, wherein the authentication object carried by the person includes is in a form of personal identification.

19. The method of claim 10, wherein the authentication object carried by the person is a card issued by a gaming property to the person carrying the card.

20. The method of claim 19, wherein the card does not identify the person by name.

21. The method of claim 10, a wherein the object is a room card for a hotel or casino.

22. The method of claim 10, further comprising revoking the value on the portable gaming tokens when the security information received from the person is not that of an entitled token owner.

23. The method of claim 10, wherein the authentication data stored with the identification number is anonymous.

24. A portable gaming token for use in a gaming property, the portable gaming token comprising:

a body;

an identification number that distinguishes the portable gaming token from other portable tokens;

authentication data associated with the identification number wherein the authentication data corresponds to security information obtained from an entitled owner of the portable gaming token, the security information selected from first biometric information associated with the entitled token owner biometric information of the entitled owner, information that the entitled owner knows, and authentication information stored on an authentication object that the entitled owner possesses and assigned to the portable gaming token to restrict redemption of value with the portable gaming token, wherein the entitled owner surrenders the portable gaming token to complete the redemption, to the entitled token owner who can present the security information for verification in order to authorize negotiation of the portable gaming token for value in game play on a gaming machine, game play at a gaming table, and redemption for cash or prizes, wherein presenting the security information includes the entitled token owner presenting the authentication object; and a wireless transponder that permits wireless communication of the identification number and the authentication data with a reader using a wireless signal that passes through the body.

25. The portable gaming token of claim 24, wherein the body is externally shaped to resemble a coin.

26. The portable gaming token of claim 25, wherein the body is non-circular.

27. The portable gaming token of claim 24, wherein the entitled token owner is a person to whom the portable gaming token was issued.

28. The portable gaming token of claim 24, wherein the entitled token owner is anonymous relative to the authentication data.

29. The portable gaming token of claim 24, further including a digital memory, internal to the body, configured to store the identification number and the authentication data.

30. The portable gaming token of claim 24, wherein the authentication data identifies security information carried by an entitled token owner.

31. The portable gaming token of claim 24, wherein the authentication data identifies security information known by an entitled token owner.

32. The portable gaming token of claim 24, wherein the security information is designed to prevent a non-entitled token owner from transacting the value on the portable gaming token.

33. A server for use in a gaming system, the server comprising:

a processor;

a memory configured to store information for a set of portable gaming tokens, the information for each portable gaming token including an identification number that distinguishes each portable gaming token from other portable gaming tokens in the set, authentication data associated with the identification number wherein the authentication data corresponds to security information obtained from an entitled token owner of each portable gaming token, the security information selected from biometric information of the entitled token owner, information that the entitled token owner knows, and authentication information stored on an authentication object that the entitled token owner possesses and assigned to each portable gaming token to restrict redemption of value on each portable gaming token, wherein the entitled token owner presents the authentication object and surrenders the portable gaming token to complete the redemption in game play on a gaming machine, game play at a gaming table, and redemption for cash or prizes, to an entitled token owner of said the each token that can present said the security information, wherein presenting the security information includes the entitled token owner presenting the authentication object; and one of: a) a private status that designates that the authentication data is needed for redemption of value on the portable gaming token, and b) a public status that designates that the authentication data is not needed for redemption of value on the portable gaming token; and a communications interface configured to communicate with a first gaming device and a second gaming device.

34. The server of claim 33, wherein the server is operated by a banking organization.

35. The server of claim 33, wherein the first gaming device and the second gaming device are located in different casinos.

36. The server of claim 33, wherein the first gaming device and the second gaming device are located in different states.

37. The server of claim 33, wherein the first gaming device is a gaming machine configured to present one or more games of chance and the second gaming device is a card table.

38. The server of claim 33, wherein the entitled token owner is a person to whom the portable gaming token was issued.

39. The server of claim 33, wherein the entitled token owner is anonymous relative to the authentication data.

40. The server of claim 33, wherein the memory further includes:

instructions for verifying that the person is an entitled token owner using the security information obtained from the person and the authentication data stored with the identification number; and instructions for authorizing the value when the person is an entitled token owner.

41. A gaming device that restricts transactions of value on a portable gaming token in game play on a gaming machine, game play at a gaming table, and redemption for cash or prizes to use by an entitled token owner of the portable gaming token, the gaming device comprising:

a processor;

a reader configured to transmit a wireless message to the portable gaming token and configured to receive a wireless message from the portable gaming token that includes authentication data for the portable gaming token wherein the authentication data corresponds to security information obtained from an entitled token owner of the portable gaming token, the security information selected from first biometric information of the entitled owner, information that the entitled owner knows, and authentication information stored on an authentication object that the entitled token owner possesses; and a memory comprising instructions for a) comparing the authentication data with the security information corresponding to the authentication data obtained from a person at the gaming device to determine if the person is an entitled token owner of the portable gaming token, wherein the comparison includes comparing the authentication information stored on the authentication object to the corresponding authentication object information assigned to the portable gaming token, and wherein at least some of the obtained authentication data includes data obtained upon the entitled token owner presenting the authentication object, and b) authorizing the value in a transaction for value with the portable gaming token wherein the person surrenders the portable gaming token to complete the transaction if the person is verified as an entitled token owner of the portable gaming token.

42. The gaming device of claim 41, wherein the gaming device is a gaming machine configured to present one or more games of chance.

43. The gaming device of claim 42, further comprising a token acceptor adapted to receive the portable gaming token from the person.

44. The gaming device of claim 42, wherein the reader is configured to poll the portable gaming token after the portable gaming token is received in the token acceptor.

45. The gaming device of claim 41, wherein the gaming device is a card table.

46. A non-transitory computer readable medium including instructions for method for transacting value on a portable gaming token, the instructions comprising:

instructions for assigning an identification number to the portable gaming token;

instructions for assigning authentication data corresponding to security information selected from first biometric information of a entitled owner, information that the entitled owner knows, and authentication information stored on an authentication object that the entitled token owner possesses to the identification number;

instructions for storing the assigned authentication data and the identification number;

instructions for receiving a request to transact the value on the portable gaming token in game play on a gaming machine, game play at a gaming table, and redemption for cash or prizes;

verifying that a person is the entitled token owner of the portable gaming token using the received second security information by comparing the received second security information corresponding to the authentication data, wherein the comparison includes comparing the information stored on the authentication object to the corresponding authentication object information assigned to the portable gaming token; and instructions for receiving second security information corresponding to the authentication data from a person, the second security information selected from biometric information associated with the entitled token owner, information that the entitled token owner knows, and information stored on the authentication object that the entitled owner possesses;

instructions for verifying that the person is an entitled token owner of the portable token by comparing the received second security information corresponding to the authentication data obtained from the person and the assigned authentication data stored with the identification number, wherein the comparison includes comparing the information stored on the authentication object to the corresponding authentication object information assigned to the identification number; and instructions for authorizing the value in a transaction for value with the portable token wherein the person surrenders the portable gaming token to complete the transaction when the person is verified as an entitled token owner of the portable gaming token.

47. The method of claim 1, wherein the portable gaming token includes a body externally shaped to resemble a coin.

48. The method of claim 10, wherein the portable gaming token includes a body externally shaped to resemble a coin.

49. The gaming device of claim 41, wherein the portable gaming token includes a body externally shaped to resemble a coin.

50. The method of claim 1, wherein at least some information stored on the authentication object includes a personal identification number.

51. The method of claim 1, wherein at least some information stored on the authentication object includes second biometric information.

52. The method of claim 10, wherein at least some information stored on the authentication object includes a personal identification number.

53. The method of claim 10, wherein at least some information stored on the authentication object includes second biometric information.

54. The non-transitory computer readable medium of claim 46, wherein at least some information stored on the authentication object includes a personal identification number.

55. The non-transitory computer readable medium of claim 46, wherein at least some information stored on the authentication object includes second biometric information.

* * * * *